(12) United States Patent   (10) Patent No.: US 8,166,057 B2
Ohguro                       (45) Date of Patent: Apr. 24, 2012

(54) DATA PROVIDING APPARATUS, DATA PROVIDING METHOD AND PROGRAM

(75) Inventor: Yoshihisa Ohguro, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 629 days.

(21) Appl. No.: 12/219,664

(22) Filed: Jul. 25, 2008

(65) Prior Publication Data

US 2009/0049026 A1    Feb. 19, 2009

(30) Foreign Application Priority Data

Jul. 26, 2007 (JP) ................ 2007-195255
Jul. 11, 2008 (JP) ................ 2008-181694

(51) Int. Cl.
    G06F 17/30      (2006.01)
(52) U.S. Cl. ............................ 707/756; 707/780
(58) Field of Classification Search .............. None
    See application file for complete search history.

(56) References Cited

U.S. PATENT DOCUMENTS

| 2003/0103673 | A1 | 6/2003 | Rathod et al. |
| 2004/0034521 | A1 | 2/2004 | Kawakura et al. |
| 2005/0120233 | A1* | 6/2005 | Halcrow et al. ............ 713/193 |
| 2008/0133935 | A1* | 6/2008 | Elovici et al. ............ 713/193 |

FOREIGN PATENT DOCUMENTS

| JP | 11-282867 | 10/1999 |
| JP | 2005-242579 | 9/2005 |
| JP | 2006-048464 | 2/2006 |

OTHER PUBLICATIONS

Search Report from the European Patent Office dated Oct. 24, 2008 for counterpart European Application, 08160810.1-1225, pp. 1-8.
Publication by Kikui et al "Cross-Lingual Information Retrieval on the WWW" of Jan. 1996 cited in the Search Report from the European Patent Office dated Oct. 24, 2008 for counterpart European Application, pp. 1-6.

* cited by examiner

*Primary Examiner* — Baoquoc To
(74) *Attorney, Agent, or Firm* — Harness, Dickey & Pierce, P.L.C.

(57) ABSTRACT

A data providing apparatus for providing search result information corresponding to-be-searched data including a search query includes a storing part storing the to-be-searched data which has been non-reversibly encoded according to a predetermined method, and the search result information to be provided as a search result with respect to the to-be-searched data, in association with each other. A converting part of the apparatus non-reversibly encodes the search query according to the same method as the predetermined method. An obtaining part of the apparatus obtains the search result information which is associated with the non-reversibly encoded to-be-searched data, with the use of the non-reversibly encoded search query. A providing part of the apparatus provides the thus-obtained search result information.

15 Claims, 20 Drawing Sheets

FIG.4

| ORIGINAL SENTENCE | | ENCODED SENTENCE |
|---|---|---|
| Hello | ⟶ | d1a7fb5eab1c16cb4f7cf341cf188c3d |
| World | ⟶ | f5a7924e621e84c9280a9a27e1bcb7f6 |
| Hello World | ⟶ | b10a8db164e0754105b7a99be72e3fe5 |

※ (HEXADECIMAL EXPRESSION : 4bits × 32 CHARACTERS= 128bits)

FIG.6

(a) TO-BE-SEARCHED DATA

| ORIGINAL SENTENCE | | ENCODED SENTENCE |
|---|---|---|
| H | → | 69fedcd0debf4ab923ec2d24fbc7ea59 |
| He | → | a64cf5823262686e1a28b2245be34ce0 |
| el | → | 65c10911d8b8591219a21ebacf46da01 |
| ll | → | 5b54c0a045f179bcbbbc9abcb8b5cfbe |
| lo | → | 7ce8636c076f5f42316676f7ca5cd4c |
| o | → | d95679752134a2d9eb61dbd7b91c4bcc |
| W | → | 61e9c06ea9a85a5088a499df6458d276 |
| Wo | → | 08b4c422407490ff16348fd8bcd27495 |
| or | → | e81c4e4f2b7b93b481e13a8553c2ae1b |
| rl | → | 3e6a5bd51b64dda3437f46edd9d45bcb |
| ld | → | 946490ad0fdc17b3b899760a445128f0 |
| d | → | 8277e0910d750195b448797616e091ad |
| , | → | c0cb5f0fcf239ab3d9c1fcd31fff1efc |
| Y | → | 6caeccadee9247bf304083eeb4203e98 |
| Yo | → | 3700f097e741a7702f7e4ac61ed88c1a |
| ou | → | 583eb722b77d6c7791d1811f6a4250c |
| u | → | b774effe4a349c6dd82ad4f4f21d34c |

(b) QUERY WORD

| ORIGINAL SENTENCE | | ENCODED SENTENCE |
|---|---|---|
| W | → | 61e9c06ea9a85a5088a499df6458d276 |
| Wo | → | 08b4c422407490ff16348fd8bcd27495 |
| or | → | e81c4e4f2b7b93b481e13a8553c2ae1b |
| rl | → | 3e6a5bd51b64dda3437f46edd9d45bcb |
| ld | → | 946490ad0fdc17b3b899760a445128f0 |
| d | → | 8277e0910d750195b448797616e091ad |

H : LINE HEIGHT
h : HEIGHT OF RECTANGLE WITHIN LINE
w : WIDTH OF RECTANGLE WITHIN LINE
ys : HEIGHT OF STARTING POINT OF RECTANGLE WITHIN LINE

FIG.16
| CHARACTER CODE | IMAGE | RECTANGLE SYMBOL CONVERTED RESULT |
|---|---|---|
| ン |  | THE NUMBER OF RECTANGLES 2→S083,S234 |
| フ |  | THE NUMBER OF RECTANGLES 1→S173 |
| 流 |  | THE NUMBER OF RECTANGLES 4→S135,S047,S089,S222 |
| ⋮ | ⋮ | ⋮ |

FIG.17

QUERY WORD (CHARACTER STRING)

| ソフ流 ⋯ |
|---|

NON-REVERSIBLE CODE CONVERTED CHARACTER STRING

| S083, S234, S173, S135, S047, S089, S222⋯ |
|---|

FIG.18

QUERY WORD (CHARACTER STRING)

| ソフ流 ⋯ |
|---|

NON-REVERSIBLE CODE CONVERTED CHARACTER STRING

AREA 1 : GOTHIC

| S083, S234, S173, S135, S047, S089, S222⋯ |
|---|

AREA 2 : MING STYLE (MINCHO)

| S234, S063, S031, S224, S176, S004, S251, S135, S047⋯ |
|---|

AREA 3 : MING STYLE (MINCHO)

| S252, S234, S047, S089, S222, S173, S135⋯ |
|---|

DATA PROVIDING APPARATUS, DATA PROVIDING METHOD AND PROGRAM

BACKGROUND OF THE INVENTION

1. Field of the Invention

The present invention relates to a data providing apparatus, a data providing method and a program, and in particular, to a data providing apparatus, a data providing method and a program for carrying out data search.

2. Description of the Related Art

Recently, computerization progresses, and various data are computerized to be utilized in various purposes. In such circumstances, confidentiality of computerized data becomes an important problem.

In the related art, as shown in FIG. 22, a common data search system is applied to a document search system. A document search system 100 is connected with a service provider apparatus 110 and a service user apparatus 120 via a communication network or such. As the service provider apparatus 110, a server, a personal computer or such is used. The service provider apparatus 110 includes a to-be-searched data storing part 111, a document taking part 112 and a comparing part 113. As the service user apparatus 120, a personal computer or such is used. The service user apparatus 120 includes an input part 121 to which a query word is input, and a display part 122 such as a liquid crystal display device.

The service user apparatus 120 has a query word input via the input part 121. The query word is a search character string for generating a direction to carry out data search, updating, deletion or such, to the service provider apparatus 110. The service user apparatus 120 then receives a search result from the search provider apparatus 110, and displays the search result on the display part 122.

In the service provider apparatus 110, the to-be-searched data storing part 111 stores document data which is used as search targets. When the above-mentioned query word is input from the service user apparatus 120, the document taking part 112 takes document data from the to-be-searched data storing part 111, and transfers the document data to the comparing part 113. The comparing part 113 compares the document data thus received from the document taking part 112 with the query word input from the service user apparatus 120. The comparing part 113 provides a comparison result to the service user apparatus 120.

As such a search system, for example, there is the Amazon Company, as an Internet site, which carries on book selling. Such a book selling search system provides bibliographic information such as book names, authors' names, and so forth, as search data, with which a user can carry out search for a desired book, so as to promote purchase of books. Further, in such a book selling search system, for the purpose of convenience of users, partial contents of books are computerized, are made usable as search targets, and thus, users can properly and positively find desired books (so-called 'contents search').

In such a book selling search system, if the entire contents of a book corresponding to a query word are made readable by a user, actual book selling may be prevented. In order to avoid such a situation, a state is entered in which printing is not available, and also, merely parts just before and after the query word are made readable by a user.

That is, in a data search system such as a document search system, it is an important problem to keep confidentiality of data. In particular, when to-be-searched data is data which should be protected by copyright, the to-be-searched data should be strictly managed, whereby management costs may increase. In such a case, the to-be-searched data cannot be distributed to a user, and should be managed on the search site provider side. For example, Japanese Laid-Open Patent Application 11-282867 discloses an art in which only parts just before and after a query word are provided in a condition that printing is not available. Japanese Laid-Open Patent Application 2006-48464, paragraph 0002 and so forth, discloses an art in which data is provided in such a state that the data is reversibly encoded (enciphered), and the data contents are provided in response to a decoding/deciphering key or such being input.

However, in the above-mentioned related arts, data is partially provided, or data which has been reversibly encoded. Therefore, further improvement is necessary in view of improving convenience of a data search system, and also, in view of protecting the data.

That is, in the related art in which data is partially provided, a user cannot satisfy and may not stop actually purchasing a story book because a main purpose of purchasing a story book may be to read the story book throughout. However, in a case of a technical book, a practical book or such, a user may satisfy when the user reads parts just before and after a query word. In such a case, the user may stop actually purchasing the book. This is a reason why further improvement is necessary.

Further, in the related art in which data is provided in such a state that printing is not available, screen display of data itself may be printed, and a user may satisfy by printing the screen display itself. In such a case, derivative use of contents cannot be avoided sufficiently. This is another reason why further improvement is necessary.

Further, in the related art in which data is reversibly encoded and provided, it is generally difficult to search for contents in a state in which the contents are encoded. Therefore, it is generally necessary to decode the contents for the purpose of determining whether the contents include a query word (i.e., search characters). However, in order to decode the contents, because there may not be a common decoding method, it is necessary to provide a special decoding apparatus each for a respective one of various encoding methods. As a result, the entire-system increases in its size, and also, increases in its costs. Further, because data is encoded reversibly, and thus, the encoded data can be decoded with the use of a proper decoding key. Therefore, when the decoding key leaks, or is deciphered, all the contents of to-be-searched data are known, and thus, confidentiality may not be kept.

Therefore, in a book search system or such, book copyright holders or publishers may be unwilling to provide electronic data of their books. Thereby, the number of books for which contents can be searched for may not be increased. Thereby chances that users can finally reach desired books may reduce, and consequently, the publishers' potential benefits may decrease.

SUMMARY OF THE INVENTION

An object of the present invention is to provide a data providing apparatus, a data providing method and a program whereby confidentiality of to-be-searched data can be positively protected, and also, convenience in search is improved inexpensively.

A data providing apparatus, a data providing method and a program for providing search result information corresponding to-be-searched data including a search query, uses a storing part configured to store, in association with each other, the to-be-searched data which has been non-reversibly encoded according to a predetermined method, and the search result information to be provided as a search result with respect to the to-be-searched data. The search query is non-reversibly encoded according to the same method as the predetermined method. Search result information which is associated with non-reversibly encoded to-be-searched data is obtained with the use of the non-reversibly encoded search query. The thus-obtained search result information is provided.

The storing part may store non-reversibly-encoded shape characteristics of the to-be-searched data. The converting part may non-reversibly encode the shape characteristics of the input search query in the same method as the predetermined method.

A plurality of sets of non-reversibly-encoded to-be-searched data corresponding to the search query may be used, and the search result information associated with each one of the plurality of sets of non-reversibly-encoded to-be-searched data may be obtained.

By the invention, to-be-searched data is used as a search target in a non-reversibly encoded state. Search characters are also non-reversibly encoded in the same method as that the to-be-searched data has been non-reversibly encoded. Then, the thus-non-reversibly encoded search characters are used to search the non-reversibly encoded to-be-searched data. Therefore, it is possible to positively protect confidentiality of the to-be-searched data.

Other objects, features and advantages of the present invention will become more apparent from the following detailed description when read in conjunction with the accompanying drawings.

BRIEF DESCRIPTION OF THE DRAWINGS

FIG. 4 shows one example of encoding according to MD5 as a non-reversible encoding method in the data search apparatus shown in FIG. 3;

FIG. 6 shows one example of encoding in a case where bigram is used as a non-reversible encoding method in the data search apparatus shown in FIG. 3;

FIG. 7 shows one example of a character image used in a data search system in a second embodiment;

FIG. 8 illustrates a circumscribed rectangle extracting process for the character image shown in FIG. 7;

FIG. 16 shows one example of a correspondence table between character codes and rectangle symbols;

FIG. 17 shows one example of converting a query word into a rectangle symbol with the use of the correspondence table between character codes and rectangle symbols shown in FIG. 16;

FIG. 18 shown one example of converting a query word into rectangle symbols depending on fonts;

DESCRIPTION OF REFERENCE NUMERALS

1 DATA SEARCH SYSTEM
10 DATA SEARCH APPARATUS
11 CPU
12 MEMORY
13 COMMUNICATION PART
14 DISPLAY PART
15 HARD DISK DRIVE
16 INPUT PART
17 CD-ROM DRIVE
18 FD DRIVE
19 BUS
20 REGISTRANT APPARATUS
21 TO-BE-SEARCHED DATA STORING PART
22 NON-REVERSIBLE CODE CONVERTING PART
30 USER APPARATUS
31 INPUT PART
32 DISPLAY PART
41 NON-REVERSIBLE CODE CONVERTING PART
42 COMPARING PART
43 DOCUMENT TAKING PART
44 TO-BE-SEARCHED DATA STORING PART
NW COMMUNICATION CIRCUIT

DETAILED DESCRIPTION OF THE PREFERRED EMBODIMENTS

Below, preferable embodiments of the present invention will be described based on figures. It is noted that, embodiments described below are preferable embodiments, thus various limitations which are technically preferable are given. However, the scope of the present invention is not limited to the embodiments.

First Embodiment

Figure 1:
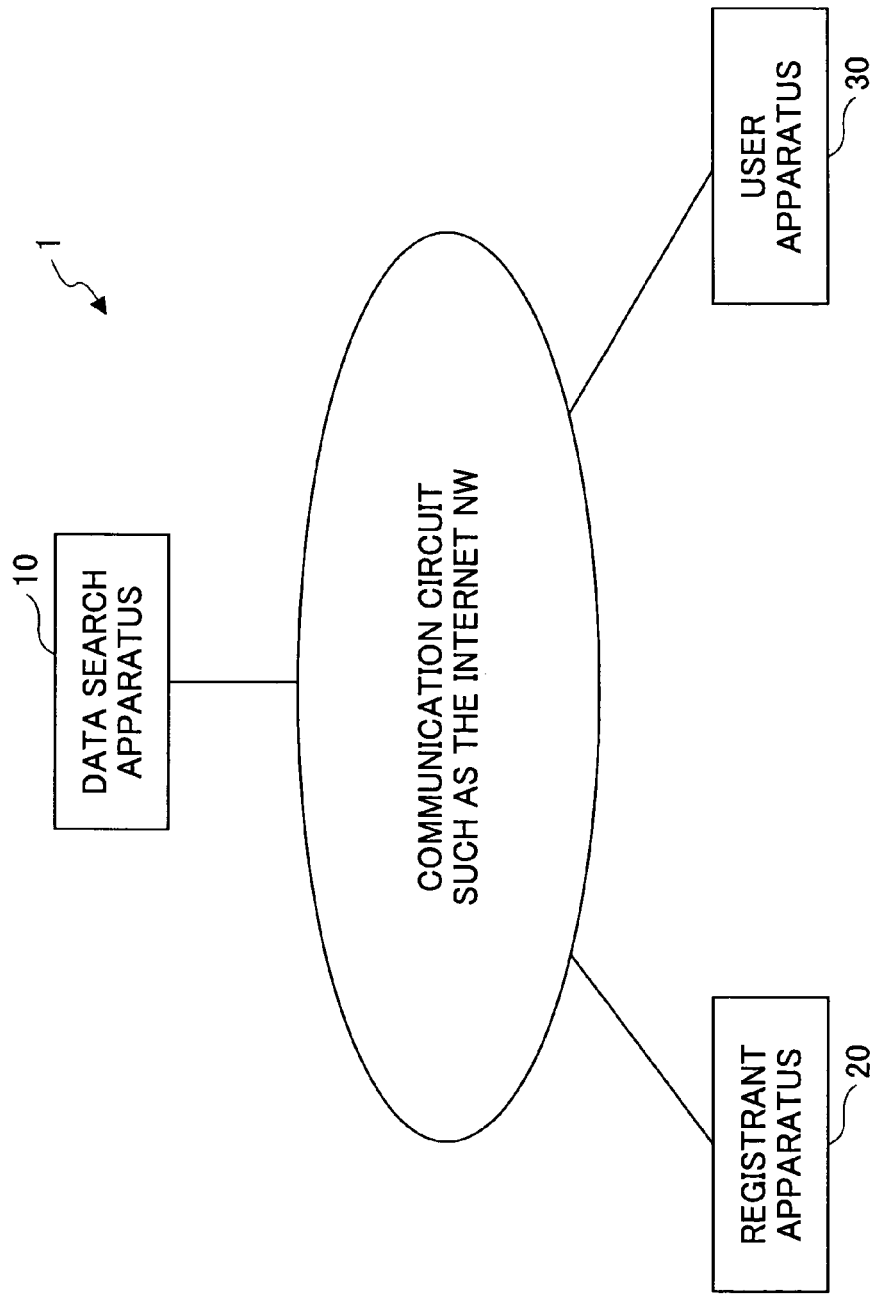
FIG. 1 shows a system configuration of a data search system in a first embodiment of the present invention.
Figure 2:
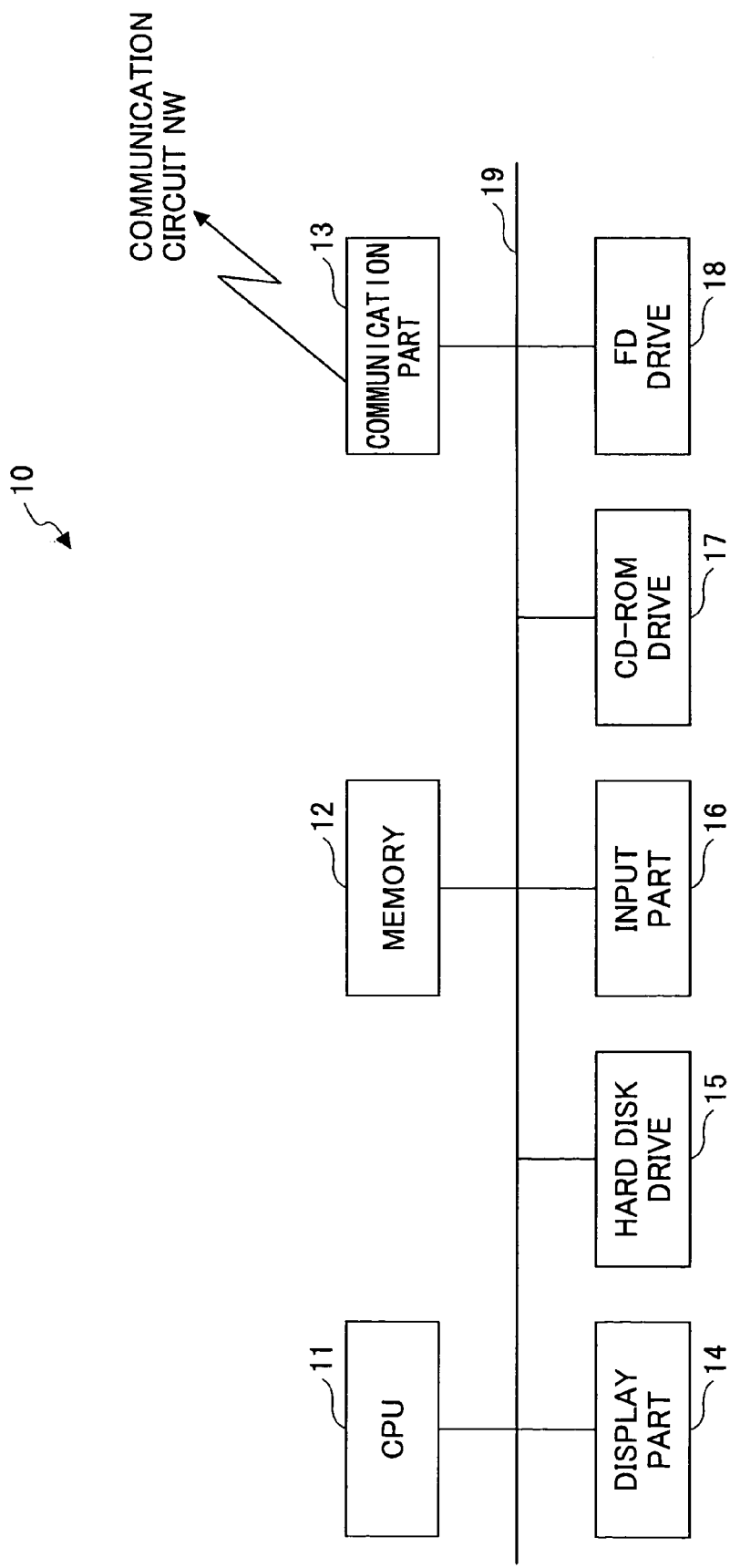
FIG. 2 shows a block configuration of a data search apparatus shown in FIG. 1.

FIGS. 1 through 6 show a first embodiment of a data search system, a data search apparatus, a data search method, a program, and a computer readable information recording medium according to the present invention. FIG. 1 show a system configuration of a data search system in which the first embodiment of a data search system, a data search apparatus, a data search method, a program, and a computer readable information recording medium is applied.

In FIG. 1, the data search system 1 includes a data search apparatus 10 of a search service provider, a registrant apparatus 20 of a registrant of to-be-searched data, and a user apparatus 30 of a search service user. The data search system 1 is connected by means of a communication circuit (or network) NW which may be a wired or a wireless one, such as the Internet, LAN (Local Area Network) or such, as shown in FIG. 1.

The user apparatus 30 is made of a personal computer or such having an ordinary hardware and software configuration. From the user apparatus 30, a query word (or a search query) input via an input part 31 (see FIG. 3) such as a keyboard is transmitted to the data search apparatus 10 via the communication circuit NW, and thus, the user apparatus 30 requests the data search apparatus 10 to carry out data search. When a search result is then transmitted from the data search apparatus 10 as a result, the user apparatus 30 outputs the search result by displaying it on a display part 32 (see FIG. 3) such as a liquid crystal display device, or by printing the search result by means of a printer (not shown) which is connected to the user apparatus 30.

Figure 3:
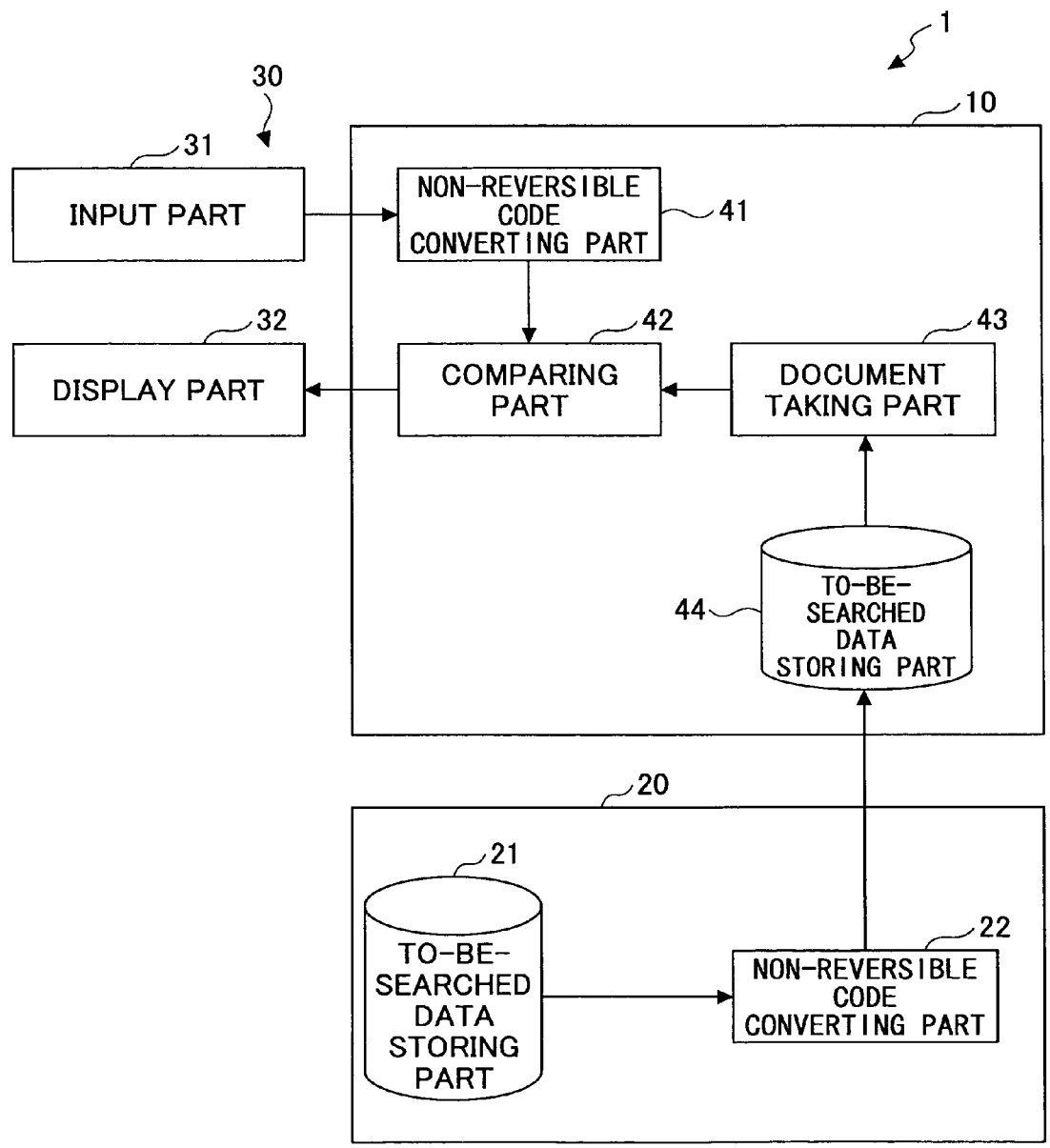
FIG. 3 shows a functional block configuration of the data search apparatus shown in FIG. 2.

The data search apparatus 10 is made of a computer having a hardware configuration as shown in FIG. 3. As shown in FIG. 3, the computer as the data search apparatus 10 includes a CPU (Central Processing Unit) 11, a memory 12, a communication part 13, a display part 14, a hard disk drive 15, an input part 16, a CD-ROM (Compact Disc Read Only Memory) drive 17 and a FD (Flexible Disk) drive 18. These respective elements are connected by a bus 19.

The memory 12 is made of a ROM (Read Only Memory), a RAM (Random Access Memory) and so forth, is used to store a basic program, and a program for carrying out such processes that the computer acts as the data search apparatus 10. Also, the memory 12 is used as a work memory by the CPU 11. The above-mentioned programs may be stored in the memory 12 as mentioned above. However, it is not necessary to limit to the case. The programs may be stored by the hard disk drive 15 instead.

The CPU 11 controls the respective elements of the data search apparatus 10 based on the program stored in the memory 12 or the hard disk drive 15 with the use of the memory 12 as a work memory. Thus, the CPU 11 carries out basic processes as the data search apparatus 10. Also the CPU 11 carries out a data search process as will be described later.

The communication part 13 is connected with the communication circuit NW, carries out communication with the registrant apparatus 20 or the user apparatus 30, and transmits data/control signals to and receives data/control signals from the registrant apparatus 20 or the user apparatus 30.

The display part 14 is made of a CRT (Cathode Ray Tube), a liquid crystal display device or such, and displays various data under the control of the CPU 11.

The hard disk drive (storing part) 15 stores various data, in particular, to-be-searched data which is used as targets of search. That is, the data search apparatus 10 registers to-be-stored data which has been transmitted from the registrant apparatus 20 via the communication circuit NW together with a registering request. The user apparatus 30 can search the to-be-searched data thus registered in the hard disk drive 15 of the data search apparatus 10. As described later, the to-be-searched data is stored in the hard disk drive 15 in a state of having been encoded in a predetermined non-reversible encoding method.

The input part 16 is made of an input device such as a keyboard, a pointing device such as a mouse, or a voice input device. With the use of the input part 16, a user of the data search apparatus 10 can input, to the data search apparatus 10, various operations or various data necessary to cause the data search apparatus 10 to operate appropriately.

The CD-ROM drive 17 has a CD-ROM (not shown) inserted thereto removably, and reads data therefrom under the control of the CPU 11.

The FD drive 18 has a FD (not shown) inserted thereto removably, and writes data to the FD, reads data or erases data from the FD, or rewrite data of the FD under the control of the CPU 11.

The data search apparatus 10 reads the program from the CD-ROM or the FD, i.e., a computer readable information recording medium in which the program is stored, via the CD-ROM drive 17 or the FD drive 18, then loads the program in the memory 12 or the hard disk drive 15, and executes the program. As a result, the data search apparatus 10 carries out a data search process as will be descried later. FIG. 3 shows a functional block configuration of the data search apparatus 10, and the data search apparatus 10 thus has a function of each block shown in FIG. 3.

As shown in FIG. 3, the data search apparatus 10 includes a non-reversible code converting part 41, a comparing part 42, a document taking part 43 and a to-be-searched data storing part 44. Respective functions of the non-reversible code converting part 41, comparing part 42 and document taking part 43 are realized by the CPU 11. A function of the to-be-searched data storing part 44 is realized by the hard disk drive 15.

The to-be-searched data storing part 44 (i.e., a storing part) stores to-be-searched data, i.e., search targets, which has been encoded in a predetermined non-reversible encoding method. When to-be-searched data which has been non-reversibly encoded is transmitted from the registrant apparatus 20 via the communication circuit NW and the communication part 13, the data search apparatus 10 carries out a process of storing the to-be-searched data in the to-be-searched data storing part 44. Further, the to-be-searched data storing part 44 stores search result information to be provided as a search result for each of predetermined divided parts of the to-be-searched data. The search result information includes, for example, a page number, a line number, a character position or such of each divided part in corresponding to-be-searched data, identification information indicating the corresponding to-be-searched data, or such, and is stored in the to-be-searched data storing part 44 together with the to-be-searched data having been non-reversibly encoded. It is noted that, the identification information indicating the to-be-searched data may include all types of information which can uniquely identify the to-be-searched data, such as URLs at which the to-be-searched data is located, ISBN or such when the to-be-searched data is books, and so forth.

The document taking part 43 takes the to-be-searched data which has been thus converted into non-reversible codes from the to-be-searched storing part 44, and transfers it to the comparing part 42.

To the non-reversible converting part (i.e., a converting unit) 41, a query word (i.e., a search query) which is a search character string which has been input via the input part 31 of the user apparatus 30 is input via the communication circuit NW and the communication part 13. The non-reversible converting part 41 converts the query word into a non-reversible code in the same non-reversible encoding method as that in which the to-be-searched data has been thus converted and stored in the to-be-searched data storing part 44, and transfers it to the comparing part 42. It is noted that, although a case where the input part 31 inputs the query word as the character string will now be described, a search query may be various information such as image data, voice data or such.

The comparing part 42 compares the query word which has been thus converted into the non-reversible code and transferred from the non-reversible code converting part 41, with the to-be-searched data which has been converted into the non-reversible codes and transferred from the document taking part 43. Thus, the comparing part 42 determines whether the query word exists in the to-be-searched data, and extracts to-be-searched data corresponding to the query word if any. When after thus extracting to-be-searched data, the comparing part 42 obtains search result information (a page number, a line number, a characters position, a URL at which the thus-extracted to-be-searched result is located, or such) which has been stored in the to-be-searched data storing part 44 in association with the thus-extracted to-be-searched data, and transmits the same to the user apparatus 30 via the communication part 13 and the communication circuit NW as a search result. Thus, the comparing part 42 and the document taking part 43 act as a search part or an obtaining part in their entirety.

The user apparatus 30 outputs the thus-received search result by displaying it on the display part 32.

As the registrant apparatus 20, a personal computer having an ordinary hardware and software configuration or such is used, and includes functional blocks of a to-be-searched data storing part 21 and a non-reversible code converting part 22.

The to-be-searched data storing part 21 stores data such as book data such as novel books, technical books, practical books, in particular, data protected by copyrights. The non-reversible code converting part 22 coverts the to-be-searched data of the to-be-searched data storing part 21 into non-reversible codes in the above-mentioned non-reversible encoding method. The registrant apparatus 20 transmits the to-be-searched data thus converted into the non-reversible codes to the data search apparatus 10 via the communication circuit NW. The data search apparatus 10 receives the to-be-searched data thus transmitted from the registrant apparatus 20 and stores the same in the to-be-searched data storing part 44.

Next, operations of the embodiment will be described. In the data search system 1 in the embodiment, the data search apparatus 10 stores to-be-searched data having been converted in the predetermined non-reversible encoding method into non-reversible codes. Then, when a query word as a search character string is input, the data search apparatus 10 converts the query word into a non-reversible code in the same predetermined non-reversible encoding method, and searches the to-be-searched data which has been converted into the non-reversible codes, with the use of the query word thus converted into the non-reversible code.

In the data search system 1, when to-be-searched data which has been converted into non-reversible codes by the non-reversible code converting part 22 of the registrant apparatus 20 in the predetermined non-reversible encoding method is transmitted from the registrant apparatus 10 to the data search apparatus 10, the data search apparatus 10 stores the to-be-searched data thus converted into the non-reversible codes in the to-be-searched data storing part 44. The to-be-searched data is thus provided for a search service.

The to-be-searched data in the to-be-searched data storing part 44 has been thus converted into the non-reversible codes in the predetermined non-reversible encoding method, which method is such that, encoding can be carried out easily, but restoring the original data from the thus-encoded data is difficult. Such an encoding method is also referred to as a one-way encrypting method. As such a non-reversible encoding method, for example, DES (Data Encryption Standard), MD5 (Message Digest 5) or such, can be cited. However, the non-reversible encoding method is not limited thereto.

In a case of MD5, details are disclosed by Rivert, R., "The MD5 Message-Digest Algorithm", RFC 1321, April 1992. In this method, as shown in FIG. 4, regardless of a length of an original sentence before it is converted into a non-reversible code, a hash of 128 bits is calculated, and it is not easy to decode the encoded sentence to the original sentence.

When a query word is input to the data search apparatus 10 from the user apparatus 30, the non-reversible code converting part 41 converts the query word into a non-reversible code in the same non-reversible encoding method as that in which to-be-searched data has been converted, which is stored in the to-be-searched data storing part 44. Then, the comparing part 42 compares the query word thus converted into the non-reversible code by the non-reversible code converting part 41, with the to-be-searched data which the document taking part 43 has taken from the to-be-searched data storing part 44. Thus, the comparing part 42 may extract, from the given to-be-searched data, to-be-searched data corresponding to the query word, and then, obtains search result information which has been stored in the to-be-searched data storing part 44 in association with the thus-extracted to-be-searched data. Thus, a search operation is carried out.

Figure 5:
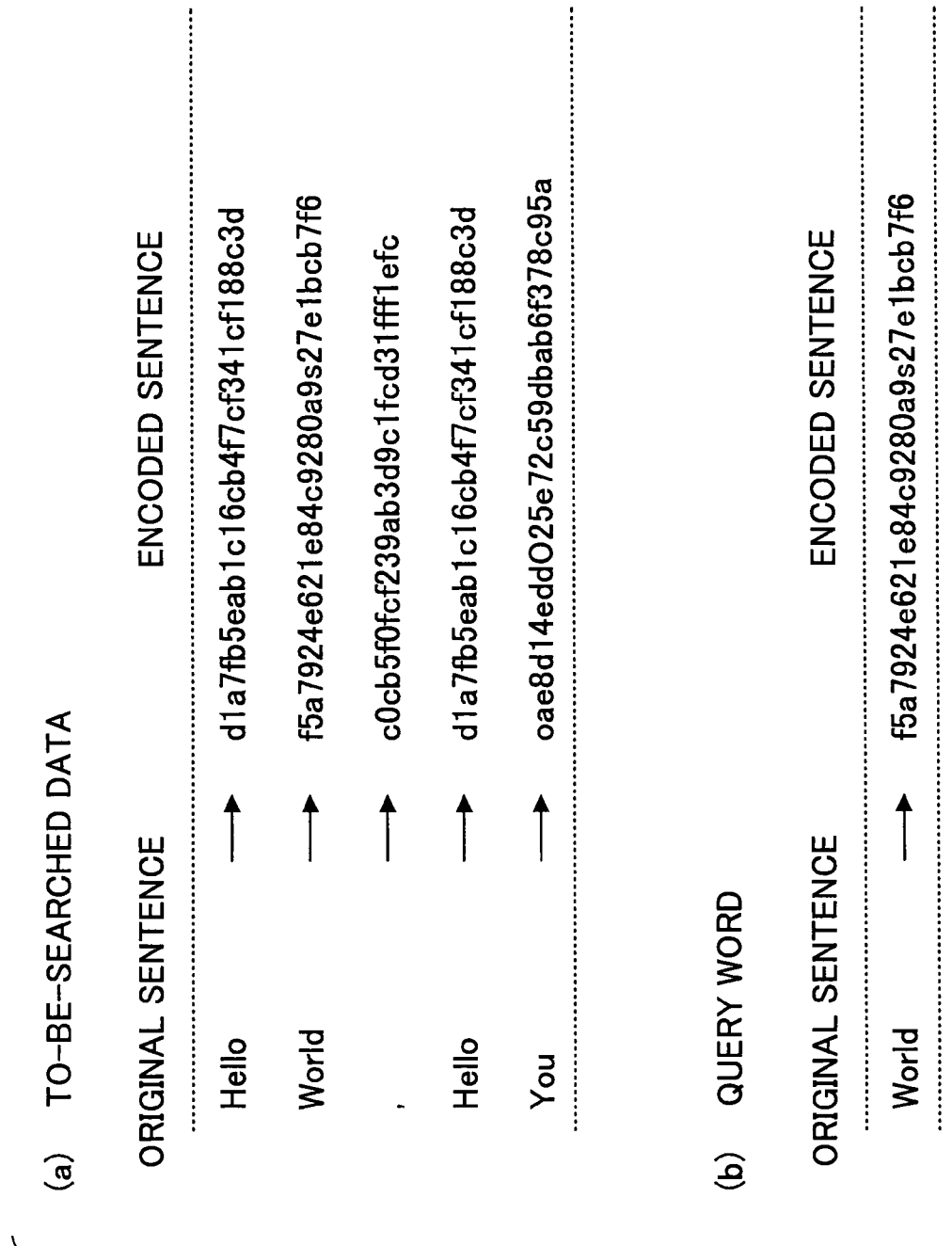
FIG. 5 shows one example of an original sentence and an encoded sentence in a case where to-be-searched data and a query word are encoded with the use of MD5 as a non-reversible encoding method in the data search apparatus shown in FIG. 3.

That is, in a case where MD5 is used as the non-reversible encoding method, in the data search apparatus 10, to-be-searched data such as "Hello World, Hello You", for example, is decomposed into respective words (i.e., into respective predetermined divided parts) as shown in FIG. 5 (*a*), each word thus obtained is encoded in MD5, and thus-obtained codes are stored in the to-be-searched data storing part 44. Then, when a "World" for example is input from the user apparatus 30 as a query word to the data search apparatus 10, the non-reversible code converting part 41 encodes the query word with the use of MD5. It is noted that, in FIG. 5, an example of Western language (i.e., English language) is shown. However, when agglutinated language such as Japanese language is used instead, encoding is carried out after to-be-searched data is divided into words with the use of a morphological analysis.

Then, in the data search apparatus 10, the comparing part 42 compares the non-reversible code thus obtained from the non-reversible code converting part 41, with the non-reversible codes of the to-be-searched data taken from the to-be-searched data storing part 44, to determine whether the non-reversible code thus obtained from the non-reversible code converting part 41 is included in the non-reversible codes of the to-be-searched data taken from the to-be-searched data storing part 44. The comparing part 42 exacts to-be-searched data corresponding to the non-reversible code thus obtained from the non-reversible code converting part 41, from the non-reversible codes of the to-be-searched data taken from the to-be-searched data storing part 44, obtains search result information which has been stored in the to-be-searched data storing part 44 in association with the thus-extracted to-be-searched data, and transmits the thus-obtained search result information to the user apparatus 30 as a search result. In the example of FIG. 5 mentioned above, the comparing part 42 determines whether the encoded sentence "f5a7924e621e84c9280a9a27e1bcb7f6" of the query word "World" is included in the encoded sentences of the to-be-searched data shown in FIG. 5 (*a*). As a specific method of comparing encoded sentences, a common method used for character string search may be used.

Thus, in the search system 1 in first the embodiment, the data search apparatus 10 stores to-be-searched data in the to-be-searched data storing part 44 in a state of having been non-reversibly encoded to be used as search targets. Then, a query word which is a search character string, input from the user apparatus 30, is non-reversibly encoded in the same method (i.e., non-reversible code conversion) as that the to-be-searched data has been encoded by the non-reversible code converting part 41. Then, the comparing part 44 compares the thus-non-reversibly converted query word with the to-be-searched data as the search targets, which has been converted into non-reversible codes and taken from the to-be-searched data storing part 44 by the document taking part 43, and thus, the comparing part 42 can appropriately search the to-be-searched data.

Thus, in the first embodiment, original to-be-searched data can be prevented from restored from search targets, and thus, confidentiality of the to-be-searched data can be positively ensured. Also, search can be available merely as a result of search characters being input, without requiring a plurality of decoding means, and thus, it is possible to improve convenience and usability inexpensively.

Thus, in the search system 1 in the embodiment, to-be-searched target documents or such and a query word are both converted into non-reversible codes, and the non-reversible codes are used to compare with one another. Thereby, it is possible to make a secret of the to-be-searched data, and to allow an authorized owner of the to-be-searched data, such as literary writings, to appropriately use a search result. At the same time, it is possible to positively prevent the to-be-searched data from being re-used, copied, or re-distributed without permission of the corresponding copyright holders. As a result, it is possible to protect copyright and also, to improve user's convenience. In the to-be-searched data storing part 44 of the data search apparatus 10, for each of pre-determined divided parts of to-be-searched data, search result information to be provided as a search result, for example, a corresponding page number, a corresponding line number, a corresponding character position, or such, is stored together with the predetermined divided part which has been converted into non-reversible codes.

Therefor, to a user, search result information such as a page number, a line number, a character position, or such, of to-be-searched data corresponding to a query data, is provided. That is, a person who has justly purchased a corresponding book or such can know the contents of to-be-searched data (i.e., the contents of the book) corresponding to the query word only by knowing a corresponding position of the to-be-searched data in the book. However, a person who does not have the book cannot know the contents of the book even by knowing search result information such as a page number or such. As a result, it is possible to positively protect a profit of a copyright holder or such who provides to-be-searched data. Also, it is possible to eliminate a resistance of the copyright holder or such to provide to-be-searched data. As a result, it is possible to increase to-be-searched data of books or such which is available for search. That is, it is possible to avoid illegal usage of original to-be-searched data of books or such, and also, it is possible to improve convenience of authorized users such as persons who have purchased corresponding books or such. It is noted that application of the embodiment is not limited to a book search system. It is also possible to apply the embodiment to a search system for apparel, cars, or such.

It is noted that, in the above discussion, the data search system 1 is configured such that, with the use of the communication circuit NW, the data search apparatus 10, the registrant apparatus 20 and the user apparatus 30 are connected, and to-be-searched data converted into non-reversible codes is registered in the data search apparatus 10 from the registrant apparatus 20. Then, the data search apparatus 10 provides the to-be-searched data to be searched by the user apparatus 30. However, as a configuration of the data search system, the above-mentioned configuration is not limited to. For example, a search user may be provided with a CD-ROM in which a data search program is stored which controls a computer such as a personal computer of the search user, and, to-be-searched data (encoded sentences) converted into non-reversible codes is also stored. The search user may install the data search program in his or her own computer as a result of the CD-ROM storing the data search program being read by the computer. As a result, it is possible to build a data search system in which the data search apparatus 10 and the user apparatus 30 shown in FIG. 3 are integrated in the computer. Then, with the use of the thus-built data search system in the computer, a query word input via a keyboard (input part) of the computer is converted into a non-reversible code, and, with the use thereof, the to-be-searched data converted into non-reversible codes and stored in the CD-ROM or copied in a hard disk drive of the computer therefrom may be searched.

By thus providing to-be-searched data (encoded sentences) itself to the user, it is not necessary to provide the data search system 10 actually connected with the communication circuit NW. Thus, it is possible to simplify the data search configuration, to save costs. Also, it is possible to make a secret of original sentences because it is difficult to restore the original sentences from the encoded sentences. Further, in this case, a user should not depend from a search service, and can carry out search with the use of an own working environment. Thus, it is possible to improve usability. Further, there may be uses to find locations of past searched information other than uses of finding unknown information. In former cases, when search data of own collection of books, or books for which the user has a reading history, has been stored in the user's own computer, it is possible to reduce required time to find a search result because search targets are thus limited. Also, it is possible to avoid useless search results, and thus, it is possible to improve usability/convenience.

Further, in the above-described data search system 1, a functional configuration is scattered or decentralized in a state of being divided into the data search apparatus 10, the registrant apparatus 20 and the user apparatus 30. However, a specific scattering manner is not limited thereto, and another appropriate manner of scattering or decentralizing the functional configuration may be used instead.

Further, to-be-searched data is not limited to a case where original sentences, as they are, are converted into non-reversible codes. For example, after original sentence data of to-be-searched data is limited to information which is necessary to search, with the use of an index table used in an N-gram index method, merely the limited information may be converted into a non-reversible codes to be used as search targets.

In this case, for example, in the above-mentioned example, in a case of N=2, i.e., in a case of bigrams, original sentences are limited to information necessary for search in bigrams, and then, the limited information is converted into non-reversible codes in a non-reversible encoding method such as MD5, to obtain encoded sentences, as shown in FIG. 6 (a). Then, when a query word is input, the query word, for example, "World" is divided into bigrams, and after that, the divided information is converted into non-reversible codes, and then, comparison is carried out so that it is determined whether all the encoded sentences of the query word which have been obtained from bigrams and non-reversibly converted are included in the to-be-searched data obtained from bigrams and non-reversibly converted, as shown in FIG. 6 (b). Thus, search is carried out.

In this case, even when plain text is obtained through deciphering from an encoded sentence with the use of a round robin algorithm, merely original bigrams are obtained. From the original bigrams, the original sentence cannot be restored, and thus, it is possible to more positively protect confidentiality of the original sentence.

Second Embodiment

FIGS. 7 through 18 shows a second embodiment of a data search system, a data search method, a program and a computer readable information recording medium.

It is noted that the present embodiment applies the same data search system as the data search system 1 in the first embodiment. Therefore, in description of the second embodiment, reference numerals used in the description of the first embodiment will be used as is necessary.

In the data search system 1 in the second embodiment, even when to-be-searched data is image data, it is converted into a non-reversible code in a non-reversible encoding method, in particular, in a non-reversible encoding method based on shape characteristics of an image.

That is, when computerized to-be-searched data is character data, even if the to-be-searched data is provided in the form of image data, the to-be-searched data may be computerized in the form of character data as a result of the to-be-searched data in the form of image data being read by means of an OCR (Optical Character Reader).

Therefore, in the data search system 1 in the second embodiment, character image data is encoded non-reversibly, so that a searchable state can be provided but it is not possible to restore the original image. Thereby, it is possible to prevent to-be-searched data from being computerized without permission of a provider (copyright holder or such) of the to-be-searched data.

Below, character image non-reversible code conversion according to a non-reversible encoding method with the use of shape characteristics (or form characteristics) of character images will be described. In the non-reversible code conversion according to the non-reversible encoding method with the use of shape characteristics of character images, a circumscribed rectangle extracting process, a line extracting process, a quantizing process and a symbol generating process are carried out in sequence.

Figure 9:
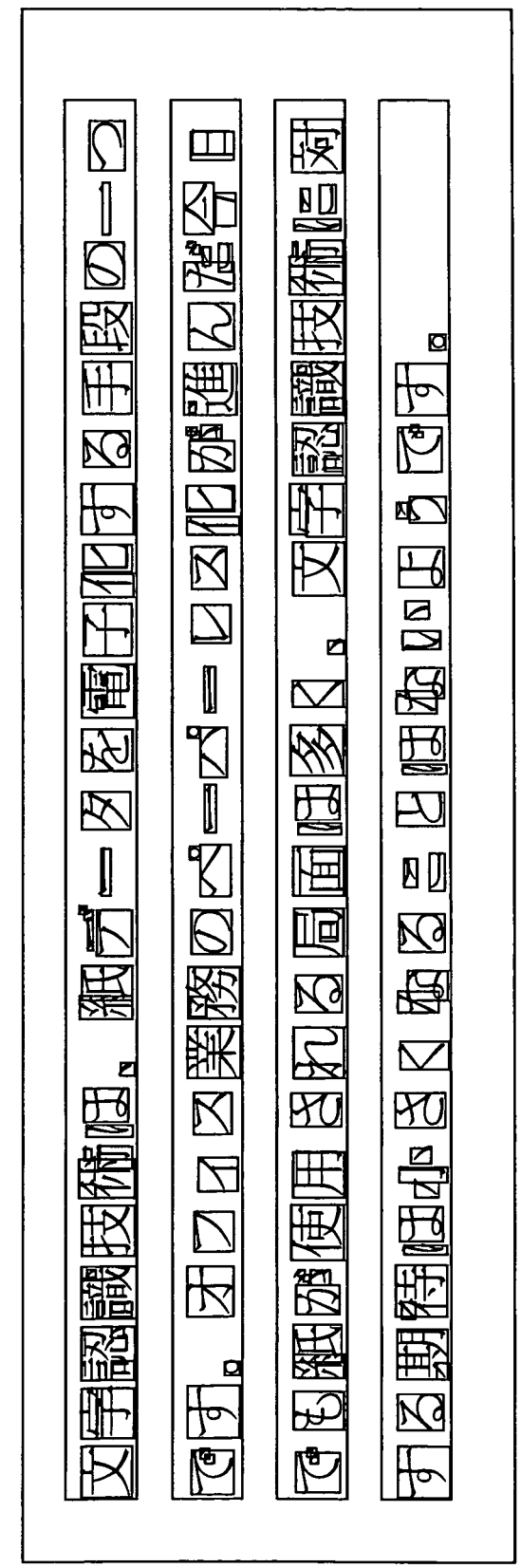
FIG. 9 illustrates a line extracting process for data obtained from the circumscribed rectangle extracting process shown in FIG. 8.

Assuming that original data (i.e., original to-be-searched data) of character images shown in FIG. 7 is provided, a circumscribed rectangle process is carried out to obtain circumscribed rectangles (i.e., predetermined divided parts) of black pixels of the original data as shown in FIG. 8. Then, as shown in FIG. 9, a line extracting process is carried out to grow a line by connecting adjacent ones of the thus-obtained circumscribed rectangles together. These circumscribed rectangle extracting process and the line extracting process can be carried out in a well-known method. Therefore, detailed description thereof will be omitted.

By carrying out growth of lines with circumscribed rectangles in both horizontal direction and vertical direction, it is possible to carry out extraction of both horizontal lines and vertical lines.

After the extraction of line images from the original data of character images is thus completed, a quantizing process to non-reversibly encode images within the lines is carried out.

In the quantizing process, rectangles which circumscribe connection of black pixels which are elements of a character image are quantized, and thus, the original image is non-reversibly encoded. That is, it is clear that, it is not possible to restore original character elements from circumscribed rectangles of connection of black pixels. Also, it is clear that, depending on particular character elements, a position and a size of a corresponding circumscribed rectangle varies, and thus, the circumscribed rectangle represents rough image characteristics of the character. Further, it is not possible to identify a character string with the use of a single rectangle. However, it is possible to identify a character string with the use of a plurality of successive rectangles derived from the character string because the successive rectangles have an arrangement unique to the original character string. Generally speaking, a case where only one character is used as a search target is rare. In many cases, a word having a plurality of characters is used as a search target. For such a string of a plurality of characters, it is possible to sufficiently limit search results from a practical standpoint, even in a case where a plurality of search results of to-be-searched data are obtained from search with the use of an arrangement of circumscribed rectangles of character elements of a search character string (i.e., a search query).

Below, a quantizing process of characteristics which represent a rectangle arrangement state obtained from a result of the circumscribed rectangle extracting process and the line extracting process will be described. After that, a symbol generating process of generating symbols from the thus-quantized characteristics which represent the rectangle arrangement state will be described.

Figure 10:
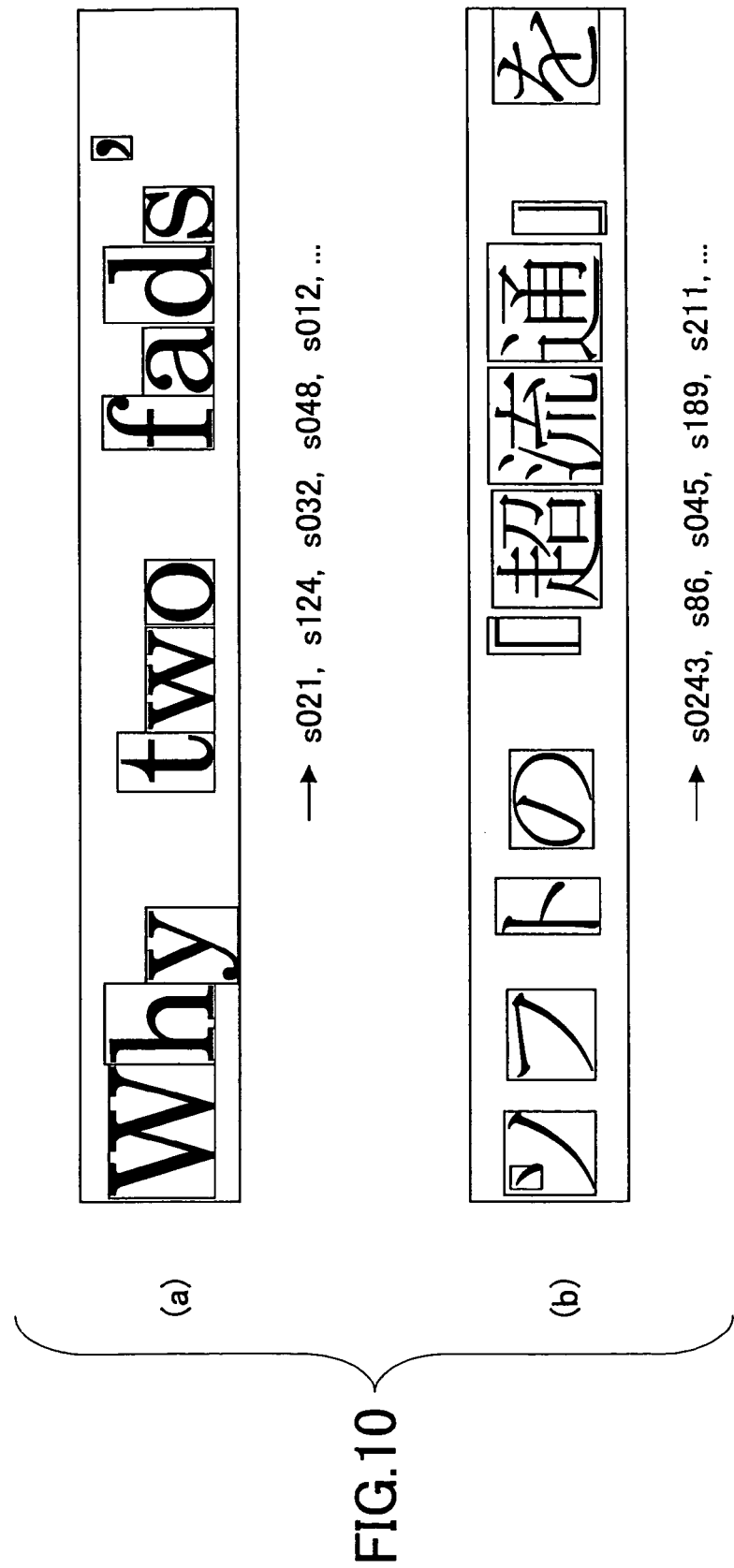
FIG. 10 shows one example in which symbols are generated from characteristics representing arrangement states of rectangles within lines for Western language and Asian language.
Figure 11:
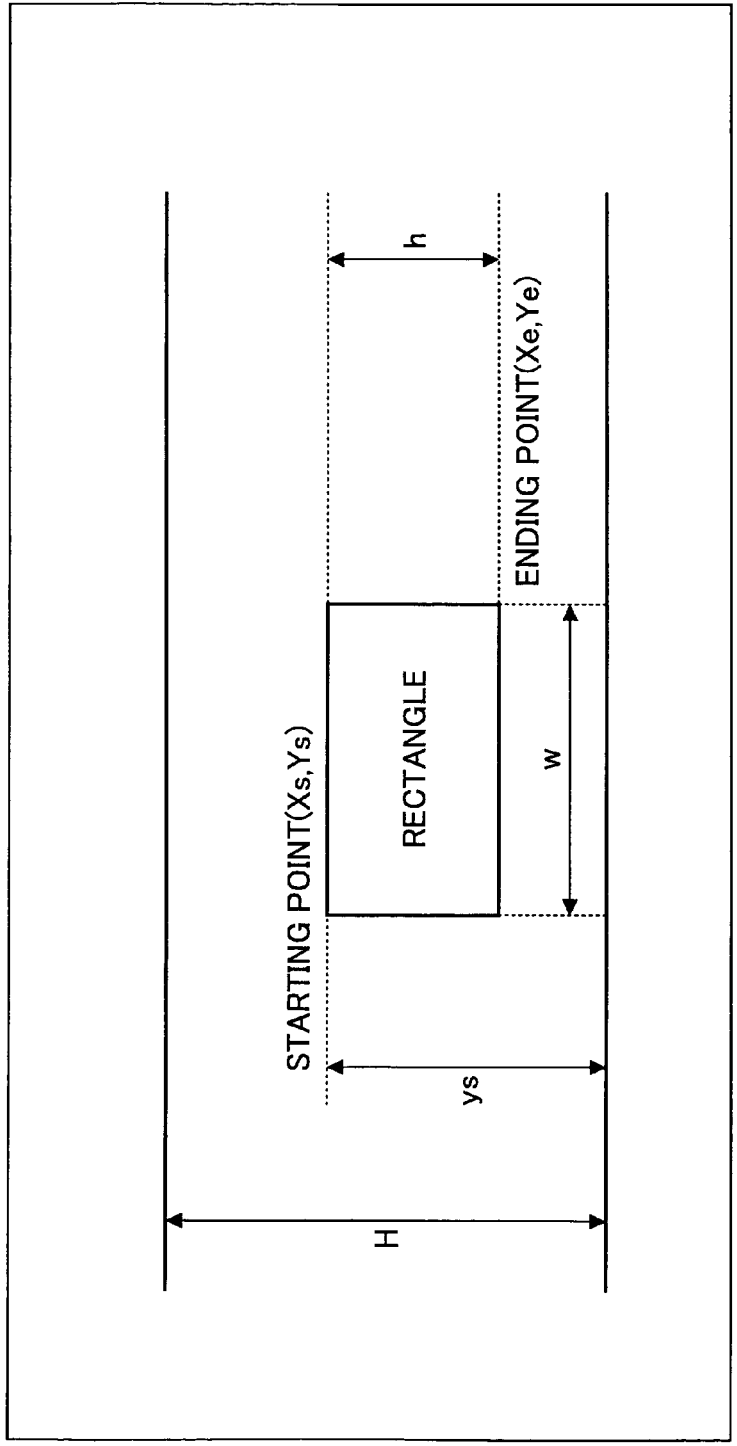
FIG. 11 illustrates a method of quantizing characteristics representing arrangement states of rectangles within lines.

As character images, for example, character images of Western language characters as shown in FIG. 10 (a), character images of Asian language characters as shown in FIG. 10 (b), and so forth, exist. When comparing between rectangles which circumscribe connection of black pixels of character elements within lines (referred to as rectangles within lines, hereinafter) of Western language characters shown in FIG. 10 (a) and rectangles within lines of Asian language characters shown in FIG. 10 (b), it can be seen that, an arrangement of rectangles within lines varies according to the contents of character lines regardless of the specific language of the character lines. Then, by focusing circumscribed rectangles of characters, it is possible to obtain rough characteristics of the characters. Therefore, without specifying characters themselves, it is possible to obtain shape characteristics which are image characteristics of character lines, only by obtaining characteristics which represent an arrangement state of circumscribed rectangles of character images. For example, as shown in FIG. 11, a starting point coordinate (Xs, Ys) and an ending point coordinate (Xe, Ye) of a circumscribed rectangle may be obtained for this purpose. It is noted that, in FIG. 11, H denotes a height of a line, h denotes a height of a rectangle within a line, w denotes a width of a rectangle within a line, and ys denotes a height of a starting point of a rectangle within a line.

Such a rectangle within a line can be uniquely defined by measuring a height ys of a starting point of the rectangle within the line, a size of the rectangle (i.e., a width w and a height h of the rectangle) and a density of black pixels within the rectangle within the line. With the use of these measurement results, it is possible to define an arrangement state of rectangles within lines. It is noted that, a rectangle within a line has been already obtained in a procedure of the line extracting process. Therefore, it is not necessary to additionally carry out characteristic extracting process to determine the character line.

FIG. 11 shows a way of calculating numerical values for quantizing an arrangement state of a character within a line. In a situation where specific original data is given, a line height is variable. In order to prevent a process from depending on a specific value of a line height, starting point height ys of a rectangle within a line is standardized by the following formula (1):

$$YsRate = ys/H \qquad (1)$$

Because 0<YsRate≦1, it is possible to easily quantize YsRate in a fixed stage. For example, when quantization is carried out in N stages, the above-mentioned formula (1) is used to obtain a quantized value YsVal by the following formula (2):

$$YsVal = INT(YsRate*(N-1)) \qquad (2)$$

(INT( ) means rounding down after the decimal point)

It is noted that each stage is labeled by 0 through (N−1).

Figure 12:
FIG. 12 illustrates a line extracting process in a case where a scanned image is inclined.

It is noted that when an original image is obtained by scanning original paper, the original image slants when the original paper slants, as shown in FIG. 12. When a slant of the original image is remarkable, the line extracting process may be failed in. However, when a slant of the original image is small, it is possible to extract a line with the use of a blank between lines.

When focusing a height ys of a starting point of a rectangle within a line, even a slight slant may affect a line extracting result. That is, in an example of Western language character lines, distances between ending points and starting points of rectangles within lines may be evenly distributed with respect to a line height H, and thus, concentration of frequencies to two places which is a feature of a Western language character line may not be observed.

Therefore, when an original image slants, a baseline d is determined as indicated by a broken line d of FIG. 12, and heights between the baseline d and starting points of rectangles within a line are obtained. Specifically, a regression line of a distribution of ending point coordinates (Xe, Ye) of the rectangles within the line is obtained. A method of obtaining the regression line is well-known, and thus, description thereof is omitted. For example, 'Introduction to Statistics for Engineer', Baifukan Co., Ltd, co-authored by I. Guttman, S. S. Wilks, discloses it.

By the above-mentioned process, it is possible to quantize a height ys of a starting point of a rectangle within a line. Similarly, a height h of a rectangle within a line can be quantized by the following formulas, each stage being labeled by 0 through (N−1):

$$HeightRate = h/H \qquad (3)$$

$$HeightVal = INT(HeightRate*(N-1)+0.5) \qquad (4)$$

It is noted that INT( ) means rounding down after the decimal point.

Further, similarly, a width w of a rectangle within a line can be quantized by the following formulas, each stage being labeled by 0 through (N−1):

$$WidthRate = w/H \qquad (5)$$

$$WidthVal = INT(WidthRate*(N-1)+0.5) \qquad (6)$$

It is noted that INT( ) means rounding down after the decimal point.

Figure 13:
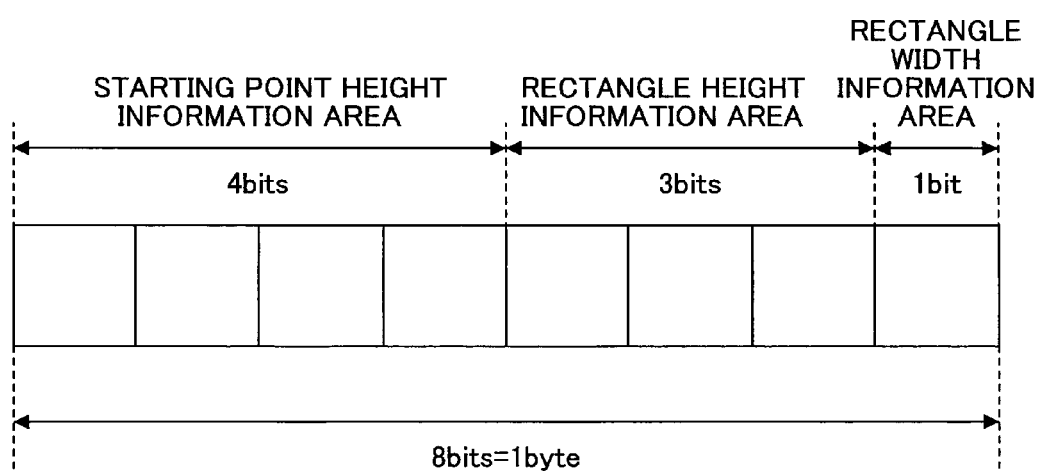
FIG. 13 shows one example in which a plurality of sets of quantized disposition information are combined to one set of image characteristics.
Figure 14:
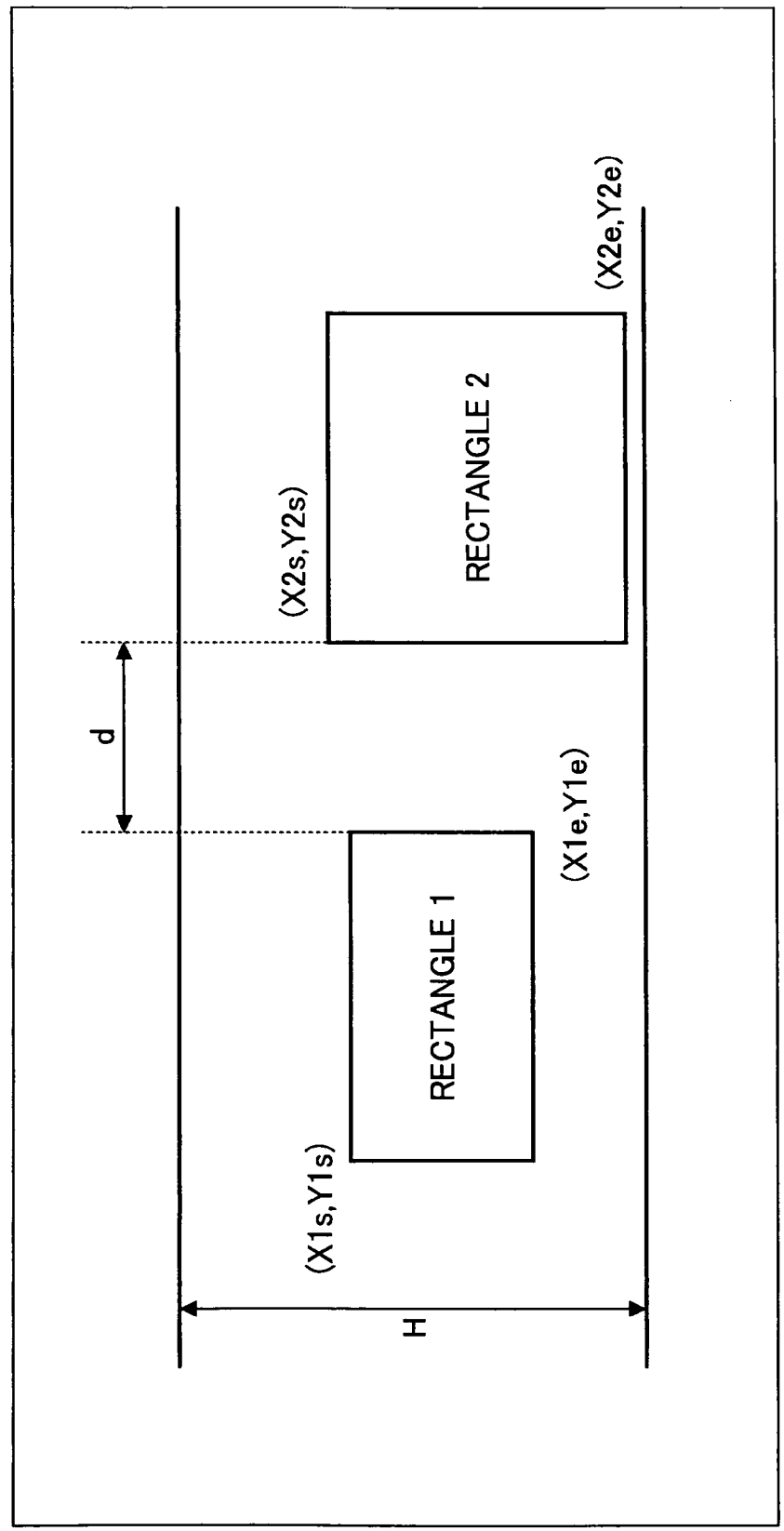
FIG. 14 illustrates quantization of an inter-rectangle distance.

Thus, a starting point height ys, a height h and a width w of a rectangle within a line are quantized. As shown in FIG. 13, these plurality of sets of quantized arrangement information are combined into one set as image characteristics (shape characteristics). FIG. 13 shows an example in which a starting point height ys of a rectangle within the line uses 4 bits, a height h of the rectangle within the line uses 3 bits and a width w of the rectangle within the line uses 1 bit. Thus, the arrangement information is integrated into a total of 1 byte.

It is noted that, image characteristics (shape characteristics) are not limited to the above-mentioned starting point height ys, height h and width w. A black pixel density within a rectangle within a line, a distance between center points of adjacent rectangles or such, may be used, depending on required difficulty of restoration of character images based on required confidentiality, a usage manner or such, of to-be-searched data.

That is, the above-mentioned starting point height ys, height h and width w are obtained only from circumscribed rectangles of elements of characters without regard to the contents of the characters. However, even when an arrangement state of rectangles within lines is identical, because Western language characters have simple structures, a black pixel density is low, while, because Asian language characters have complicate structures, a black pixel density is high. Of course, within Asian language characters, Hiragana and Katakana have simple structures, and thus, a black pixel density is low. In contrast thereto, Chinese characters (Kanji) have complicate structure and thus, a black pixel density is high. Thus, a black pixel density within a rectangle within a line can be used as characteristics to distinguish characters. Therefore, it is possible to similarly quantize a black pixel density (=(the number of black pixels within a rectangle within a line)/(the total number of pixels within the recognize within the line)), so that it is possible to make it difficult to restore original characters.

Thus, an arrangement state of rectangles within lines may be defined with the use of a plurality of measurement requests. The plurality of measurement results defining rectangles within lines may include those which are not necessary, depending on a specific search target. For example, when to-be-searched data is only Latin language characters, a black pixel density is not necessary. That is, as to Latin language characters, any character has complexity approximately at the same level. Therefore, a black pixel density of a rectangle within a line is approximately at the same level every character, and thus, this feature does not actually contribute to featuring a rectangle within a line in a case of Latin language.

Thus, depending on a feature of collection of search character strings (search queries) and to-be-searched data, characteristics which do not affect identification may exist, which may be thus useless. Therefore, by actually using, from among a plurality of measurement results, only characteristics which are actually worthy to distinguish between a target line and another line, it is possible to improve search efficiency.

Further, as shown in FIG. 10, a difference in arrangement states between Western language characters and Asian language characters appears in a distance between adjacent rectangles. In Western language characters, a distance between adjacent rectangles is many case a positive value. That is, there are few cases where adjacent rectangles overlap one another. In contrast thereto, in Asian language characters, a case where adjacent rectangles overlap one another may occur frequently. Further, there is a character in which, as 'i' or 'j' of an alphabet, a point exists vertically above a rectangle, a character in which, as an umlaut of German language, two points exist above a rectangle, and a character in which a (N+~) of Spanish language exists. Such characteristics may be quantized, and thereby, it is possible to define an arrangement state of a rectangle in a line in more detail. Specifically, in respective rectangles (rectangle 1, rectangle 2) of FIG. 14, a distance d between rectangles is obtained by the following formula, and a rate between a target rectangle and an adjacent rectangle is quantized in a fixed stage, each stage being labeled by 0 through (N−1):

$$RightDistanceRate = d/H \quad (7)$$

$$RightDistanceVal = INT\_PLUS(RightDistanceRate * (N-1)) \quad (8)$$

It is noted that INT_PLUS( ) means changing into a positive value and rounding down after the decimal point.

By using the distance from an adjacent rectangle, it is possible to define characteristics of a line including many Asian language characters in more details. Thereby, it is possible to strictly determine a character line.

Next, a symbol generating process of generating a symbol (i.e., a converted key) from thus-quantized characteristics which represent an arrangement state of a rectangle within a line will be described. In the symbol generating process, a plurality of types of measurement results concerning one rectangle within a line are integrally symbolized, and thus, it is possible to make one rectangle within a line to correspond to a single symbol. For example, the above-mentioned three types of information, i.e., a starting point height of a rectangle, a rectangle height and a rectangle width are integrated. It is assumed that, in the above-mentioned process, a height of a stating point of a rectangle ys/H is quantized in 15 stages, a rectangle height h/H is quantized to 8 stages, and a rectangle width w/H is quantized to 2 stages. Because, as shown in FIG. 13, a rectangle starting point height ys/H has 15 stages and thus, requires 4 bits. A rectangle height h/H has 8 stages and thus, requires 3 bits. A rectangle width has 2 stages and thus requires 1 bit. As a result, it is possible to express the information by a total of 1 byte.

Further, because 4 bits+3 bits+1 bits=8 bits, it is possible to store all the information in the respective bits of 1 byte. The number of types of the symbol thus integrating the three types of information is calculated as follows:

15 stages×8 stages×2 stages=240 types

Specific types of information to be integrated and a storage area or a storage size for storing the information are not fixed, and preferable information for specifying a character line which is a search target may be selected appropriately.

Figure 15:
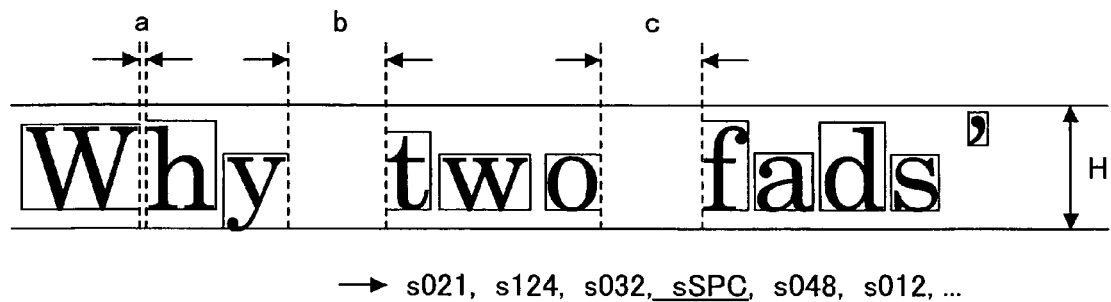
FIG. 15 illustrates a blank symbol inserting process based on an inter-rectangle distance.

It is noted that, information indicating an existence of a blank within a character line also features the line. In particular, in a Latin language character line for which there is a custom to insert a blank within words, it is important characteristics. An existence of a blank within a line can be detected as a result of a distance between a rectangle within a line and an adjacent rectangle is compared with a height of the line. For example, in FIG. 15, a threshold is provided for a rate of an inter-rectangle distance with respect to a line height (a/H, b/H, c/H). Then, the rate of inter-rectangle distance with respect to the line height is compared with the threshold, and, it is determined that a blank exits when the rate of the inter-rectangle distance with respect to the line height is large. When it is thus determined that a blank exists, as shown in FIG. 15, a symbol sSPC, for example, meaning a blank, is inserted in a symbol sequence. It is noted that, in FIG. 15, 's021', 's124', 's032', 's048' and 's012' shown, each represents a symbol thus generated in the symbol generating process. In a case of FIG. 13, the storage area size is 1 byte, while the number of symbols corresponding to rectangle arrangement information is 240 as mentioned above. Therefore, it is possible to further set 16 types of special symbols (i.e., 256−240=16). The symbol for a blank is made to correspond to any one of the 16 types.

As described above, for image data of to-be-searched data, the circumscribed rectangle extracting process, line extracting process, quantizing process and symbol generating process are carried out in sequence. Thus, it is possible to convert arrangement information (shape characteristics) of rectangles in lines to a symbol sequence, as shown in FIG. 10 (*a*), (*b*) and FIG. 15.

Then, in the search system 1 of the second embodiment, the non-reversible code converting part 22 of the registrant apparatus 20 generates a symbol sequence which is a non-reversibly encoded converted key for each of predetermined divided parts (i.e., rectangles in lines) of to-be-searched data. The registrant apparatus 20 then stores the thus-generated symbol sequences in the to-be-searched data storing part 44 of the data search apparatus 10.

In this state, a query word is input to the input part 31 of the user apparatus 30, and the thus-input query word is input to the non-reversible code converting part 41 of the data search apparatus 10 via the communication circuit NW. Then, the non-reversible code converting part 41 (converting part) generates a character string image from text data of the query word. The generation of the charter string image from text data of the query word can be carried out with the use of a font generator, a common technique for generating a printing preview image, or such. After thus generating the character string image from the text data of the query word, the non-reversible code converting part 41 carries out, the same as the above, a circumscribed rectangle extracting process, a line extracting process, a quantizing process and a symbol generating process in sequence on the thus-obtained character string image. Thus, the character string image is converted into a symbol sequence. Then, the non-reversible code converting part 41 transfers the thus-obtained symbol sequence to the comparing part 42.

That is, for example, it is assumed that, a query word 'ソフ流' (i.e., a string of Japanese language characters) is input as shown in FIG. 16. From the character codes, a character string image is generated, and then, on the thus-generated character string image, the above-mentioned circumscribed rectangle extracting process, line extracting process, quantizing process and symbol generating process are carried out in sequence. Thus, each character code is converted into symbols. The thus-obtained symbols are, as shown in FIG. 17, converted into a symbol sequence which is a non-reversible code sequence. However, the number of rectangles corresponding to one character is not limited to one. A plurality of symbol sequences may be generated from one character.

This conversion from a character code into respective symbols may be carried out, with the use of a character code—symbol correspondence table such as that shown in FIG. 16 which has been previously prepared.

The comparing part 42 compares the symbol sequence received from the non-reversible code converting part 41 with the symbol sequence of the to-be-searched data taken from the to-be-searched data storing part 44 by the character taking part 43. Thus, the comparing part 42 extracts a symbol sequence of the to-be-searched data corresponding to the symbol sequence of the query word, obtains search result information (a page number, a line number or such) stored in the to-be-searched data storing part 44 in association with the thus-extracted symbol sequence of the to-be-searched data, and transmits the search result information to the user apparatus 30 as a search result.

In this case, the comparing part 42 may extract a plurality of symbol sequences corresponding to the symbol sequence of the query word.

That is, the non-reversible code sequence can be regarded as a symbol sequence which has symbol units different from the original characters. Therefore, the non-reversible code sequence (i.e., a symbol sequence) may be different in its length from that of the original character string. However, when a query word is a character string included in to-be-searched data (i.e., a to-be-searched document), the same symbol sequence should be also generated from the same character string of the query word as that generated from corresponding to-be-searched data.

Therefore, after a to-be-searched data character string and a query word are both converted into respective symbol sequences, they can be compared with one another with the use of an ordinary text search technique. Thus, the comparing part 42 carries out comparison to appropriately determine whether a symbol sequence of a query word is included in symbol sequences of to-be-searched data. Then, when each of a plurality of symbol sequences of the to-be-searched data corresponds to the symbol sequence of the query word, the comparing part 42 extracts the plurality of symbol sequences accordingly.

Thus, in the search system 1 in the second embodiment, the to-be-searched data storing part 44 of the data search apparatus 10 stores symbol sequences (i.e., converted keys) which have been obtained as a result of shape characteristics of rectangles in lines (i.e., divided parts) of to-be-searched data as images or to-be-searched data having been converted into images being non-reversibly encoded in a non-reversible encoding method. The non-reversible code converting part 41 converts an input query word, i.e., search characters, into an image, and converts shape characteristics of the thus-obtained query word image into a non-reversibly encoded symbol sequence in the non-reversible encoding method. The comparing part 42 compares the thus-non-reversibly encoded query word with the to-be-searched data having been converted into non-reversible codes and taken from the to-be-searched data storing part 44 by the document taking part 43, and thus, carries out search.

Therefore, it is possible to further effectively prevent original to-be-searched data from being restored from a search target, and thus, it is possible to further positively ensure confidentiality of the to-be-searched data. Also, it is possible to carry out search only by inputting search characters, without preparing a plurality of decoding means. Thus, it is possible to improve usability/convenience of data search inexpensively.

Further, in the to-be-searched data storing part 44 of the data search apparatus 10, search result information is stored together with to-be-searched data having been converted into non-reversible codes, to be provided as search results, for each of predetermined divided parts of the to-be-searched data. The above-mentioned search result information includes page numbers, line numbers, or such.

Therefore, it is possible to provide search result information such a page number, a line number, a character position or such, of a divided part of the to-be-searched data, which corresponds to a given query word.

It is noted that, in the above description, as image characteristics of a rectangle, a plurality of characteristics such as a starting position, a rectangle size, a black pixel density within a rectangle, a distance between center positions of adjacent rectangles, and so forth, are cited as examples. However, when the number of characteristics to use increases, an original character image may be restored more easily. Therefore, to-be-searched data having been converted into symbol sequences, for each of image characteristics or such, may be prepared in the to-be-searched data storing part 44. Then, from an input part such as a keyboard of the data search apparatus 10, image characteristics to be actually used for image search may be selected and set depending on a desired level of difficulty in restoring an original character image. Then, the non-reversible code converting part 41 may use only the thus-selected-and-set image characteristics to converts a query word input from the user apparatus 30 into a symbol sequence, and carries out search with the use of the symbol sequence.

Thereby, it is possible to adjust a level of confidentiality to be provided, according to an actual value of to-be-searched data, and thus, it is possible to simultaneously improve protection of right of a right holder of the to-be-searched data such as a copyright holder, and also, to promote publishing of the data.

Further, image characteristics of a character vary according to a specific font type of the character. That is, although rectangle characteristics are characteristics which are not likely affected by a difference in font types, it is not possible to say that rectangle characteristics are never affected thereby. Therefore, if rectangle characteristics vary as a result of a font in a character string image generated from text data of a query word being different from a font used in to-be-searched data, search may be failed in.

Therefore, ID information indicating respective font types is attached to image characteristics of to-be-searched data, in page units, line units, and rectangle units, and is stored in the to-be-searched data storing part 44 together.

Then, when the non-reversible code converting part 41 of the data search apparatus 10 generates a character string image from a query word given from the user apparatus 30, the non-reversible code converting part 41 generates the character string images according to font types which have been designated to the image characteristics of the to-be-searched documents. Then, after obtaining rectangle characteristics from the character string images, the non-reversible code converting part 41 converts the rectangle characteristics into symbol sequences as shown in FIG. 18. In order to actually obtain a character string image from text data of a query word, font data may be used. For example, vector data such as true type fonts is extended and bitmap data (i.e., an image) of a character is generated, and thus, the query word (text) is converted into a symbol sequence. Therefore, the non-reversible code converting part 41 should have a function to extend, from character font sets and character text, into character fonts, generate character string images from a text character string, and after that, convert the character string images into symbols of rectangles within lines.

Thereby, when a character string image having been generated is converted into symbols of rectangles within lines, it is possible to carry out search in consideration of variation of symbols of rectangles within lines caused by a difference in font types with the use of the font sets. Thus, it is possible to carry out appropriate search.

However, in such a configuration, it is necessary to prepare the font data for all possible characters, and also, to carry out a process of generating character string images, in order to convert them to sequences of symbols of rectangles within lines.

Therefore, for each character, a result of converting into symbols of rectangles within a line is prepared, and, a character code—symbol correspondence table in which, for each character, symbols representing arrangement information of rectangles within the character is stored in association with each other, similar to the character code—symbol corresponding table shown in FIG. 16, is prepared. Therewith, it is possible to rapidly and easily convert from a character string of input text into sequences of symbols of rectangles.

Further, when extracting a symbol sequence of to-be-searched data corresponding to a symbol sequence of a query word, the comparing part 42 can extract a plurality of symbols sequences of the to-be-searched data corresponding to the symbol sequence of the query word as mentioned above.

Therefore, a user of search can positively obtain a search result of to-be-searched data corresponding to an input query word, and thus, it is possible to improve usability/convenience of data search.

Third Embodiment

Figure 19:
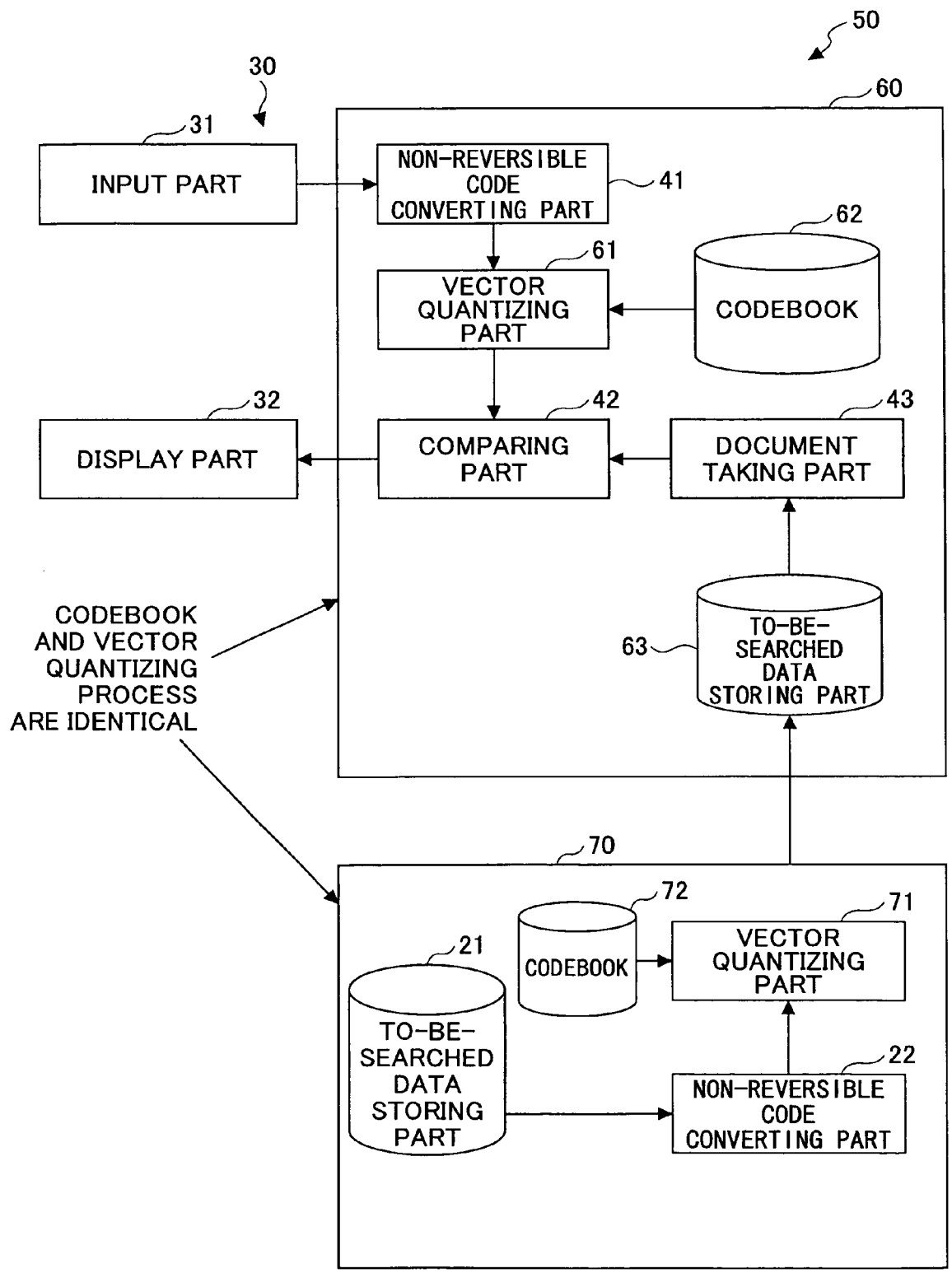
FIG. 19 shows a system configuration of a data search system in a third embodiment of the present invention.
Figure 20:
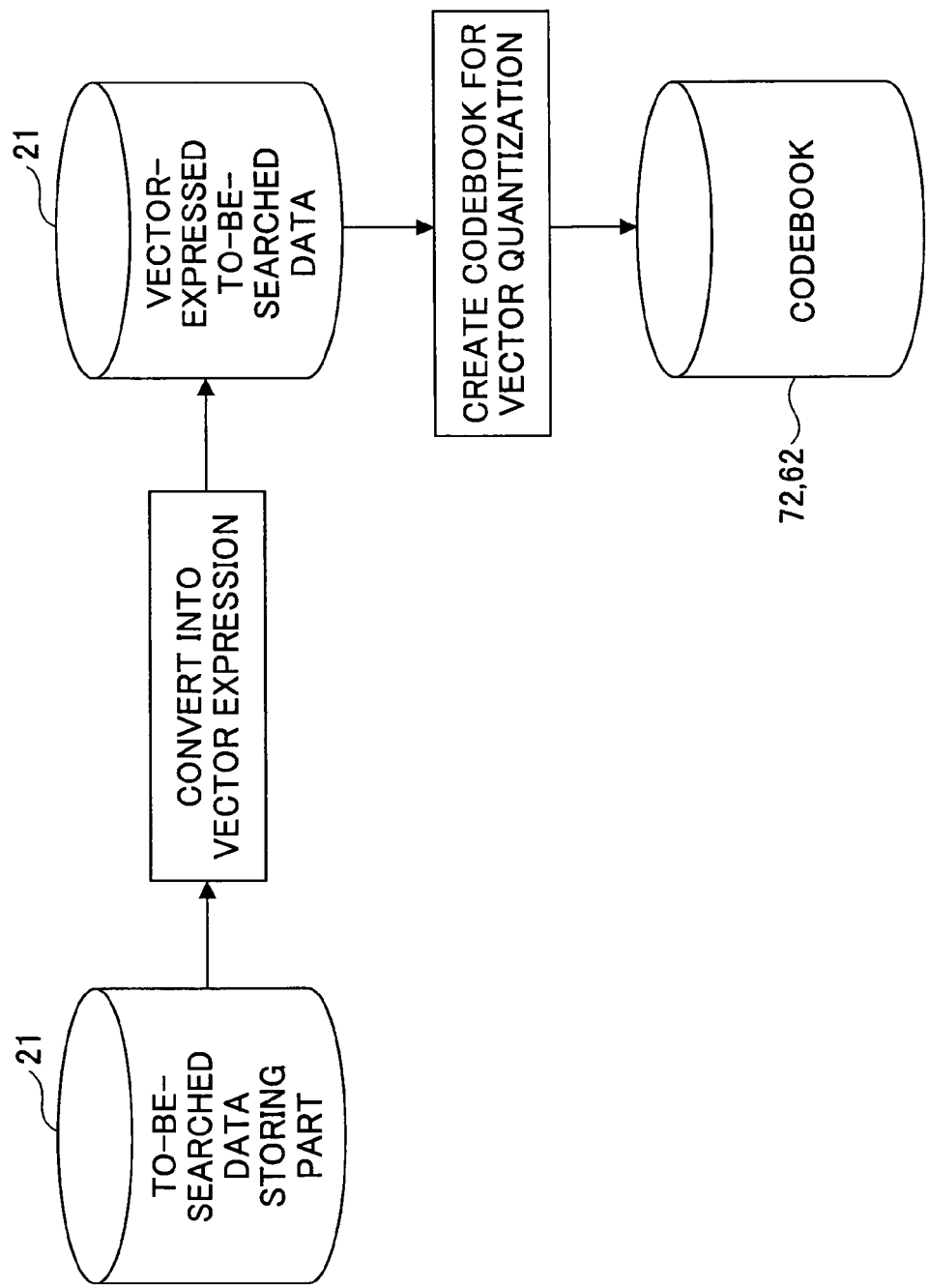
FIG. 20 illustrates a codebook creating process in the data search system shown in FIG. 19.
Figure 21:
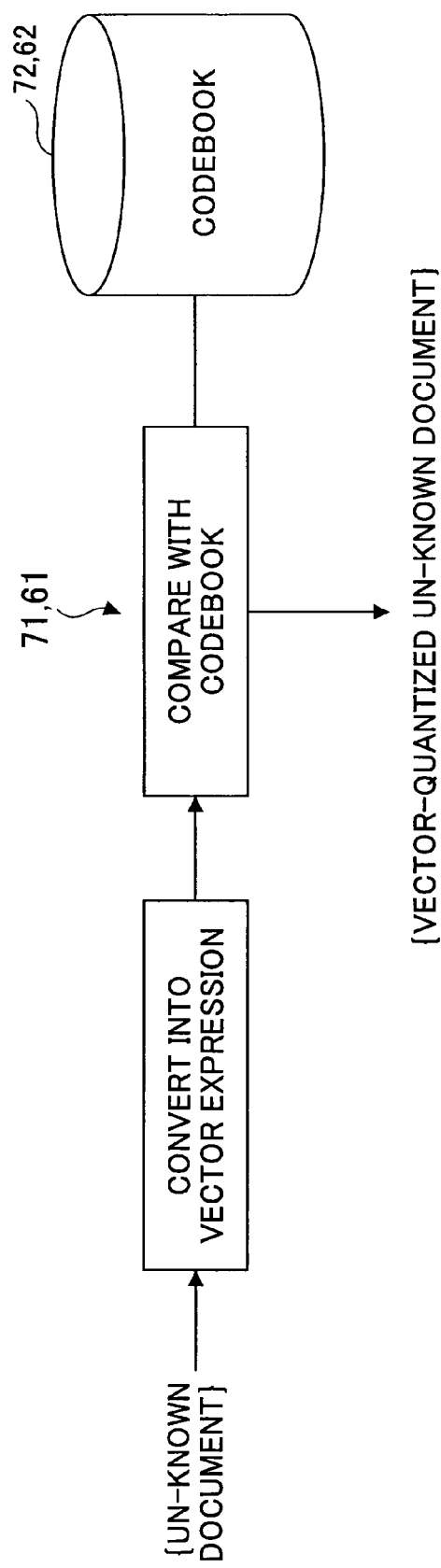
FIG. 21 illustrates a query word vector quantizing process in the data search system shown in FIG. 19.
Figure 22:
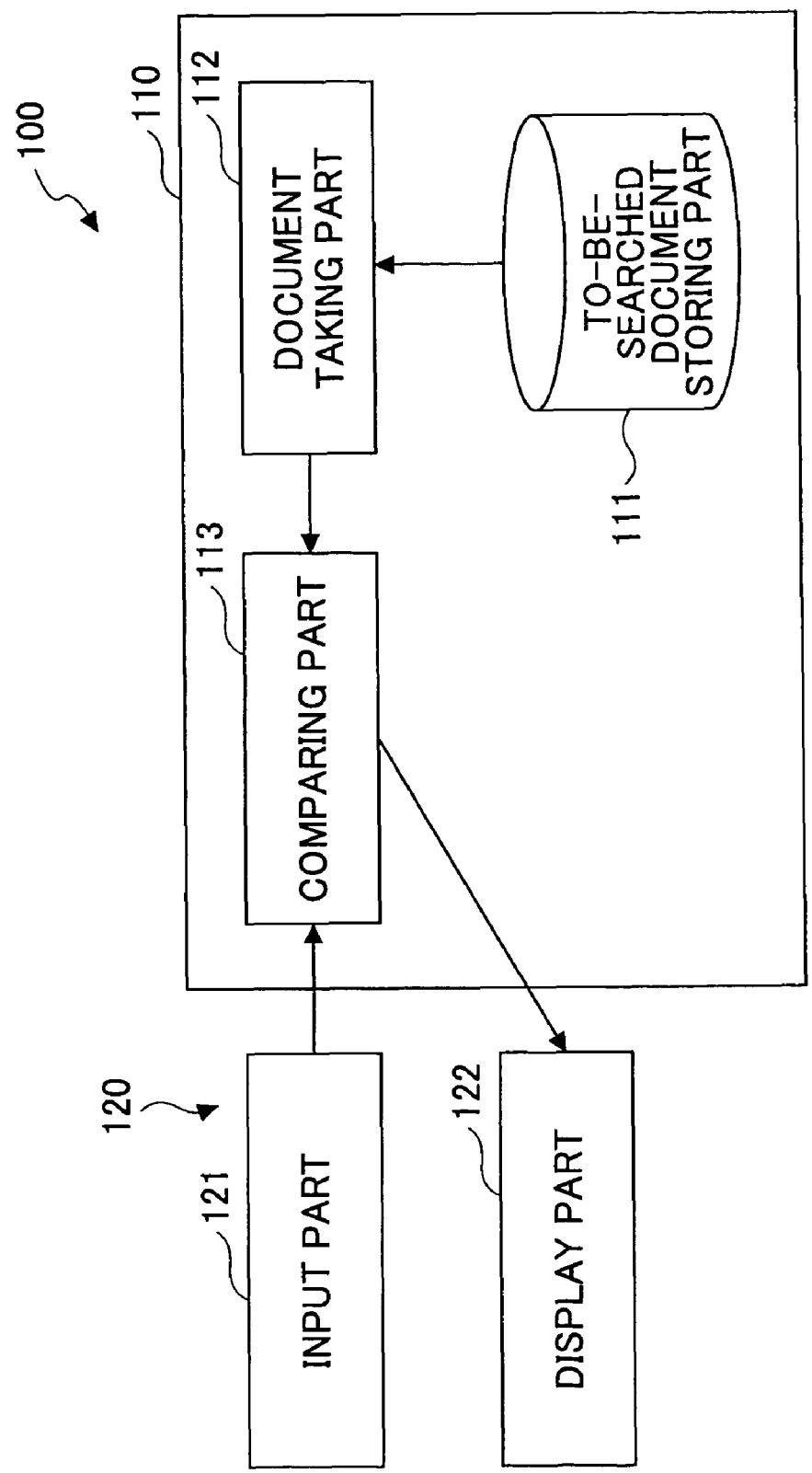
FIG. 22 shows a general block configuration of a data search system in the related art.

FIGS. 19 through 21 show a third embodiment of a data search system, a data search apparatus, a data search method, a program and a computer readable information recording medium according to the present invention. FIG. 19 shows a system configuration of a data search system 50 to which the third embodiment of a data search system, a data search apparatus, a data search method, a program and a computer readable information recording medium according to the present invention is applied.

It is noted that, in description of the third embodiment, the same reference numerals are given to the same elements of the data search system 1 in the first and second embodiments, and detailed description therefor will be omitted or simplified.

In the data search system 50 in the third embodiment, a data search apparatus 60, a registrant apparatus 70 and a user apparatus 30 are included, and are connected via a communication circuit NW (not shown).

The user apparatus 30 is the same as the user apparatus 30 of the first and second embodiments, and includes at least an input part 31 used for inputting a query word, and a display part 32 (i.e., an output part) for displaying a search result obtained from the data search apparatus 60.

The registrant apparatus 70 is the same as the registrant apparatus 20 in the first and second embodiments, is made of a personal computer having an ordinary hardware and software configuration, and, has, as functional blocks, a to-be-searched data storing part 21 and a non-reversible code converting part 22, the same as those mentioned above. Further, the registrant apparatus 70 has a vector quantizing part 71 and a codebook 72.

The to-be-searched data storing part 21 stores to-be-searched data before being converted into non-reversible codes. The non-reversible code converting part 22 converts the to-be-searched data stored in the to-be-searched data storing part 21 into non-reversible codes in a non-reversibly encoding method.

The vector quantizing part 71 carries out vector quantization of the to-be-searched data having been thus converted into the non-reversible codes, with the use of the codebook 72. That is, first, a plurality of shape characteristics (i.e., a collection of rectangles) representing an arrangement state of the rectangles obtained from character images of the to-be-searched data are regarded as respective dimensions (i.e., a collection) of a multi-dimensional vector. Then, the rectangles can be converted into single vector data (i.e., vector quantization) with the use of the respective characteristics. Then, by labeling the thus-obtained representative vectors in sequence, it is possible to convert a vector data sequence into a simple one-dimensional symbol data sequence. It is noted that, the vector quantization means, as well-known, obtaining, from a variety of vector data, a small number of sets of vector data representing the variety of vector data. 'Vector Quantization and Information Compression', Corona Publishing Co., LTD, written by Allen Gersho and Robert M. Gray, translated by Saburo Tasaki et al. discloses details thereof.

By thus converting into a symbol sequence, as described above for the second embodiment, it is possible to learn a tendency of an arrangement. For example, as shown in FIG. 20, a three-dimensional vector is obtained concerning an arrangement of rectangles from to-be-searched data having been converted into non-reversible codes and stored in the to-be-searched data storing part 21, obtaining therefrom a collection of 240 types or such of representative rectangles (i.e., representative vectors), and creates the collection of the representative vectors (i.e., a representative vector group) as the codebook 72. The codebook 72 includes only the representative vectors obtained from vector conversion of to-be-searched data of the to-be-searched data storing part 21, and the codebook 72 is transferred to the data search apparatus 60 as a codebook 62.

Then, the vector quantizing part 71 converts the to-be-searched data of the to-be-searched data storing part 21 having been converted into non-reversible codes by the non-reversible code converting part 22, in a three-dimensional vector expression, and, carries out vector quantization by comparing with the representative vectors of the codebook 72, as shown in FIG. 21. The registrant apparatus 70 transfers the thus-vector-quantized to-be-searched data to the data search apparatus 60.

The data search apparatus 60 includes a non-reversible code converting part 41, a comparing part 42 and a document taking part 43, the same as those of the first and second embodiment mentioned above, and also, includes a vector quantizing part 61, the codebook 62 and a to-be-searched data storing part 63.

As mentioned above, the codebook 62 has been transferred from the registrant apparatus 70 and thus, is the same as the codebook 72 of the registrant apparatus 70. The data search apparatus 60 receives the to-be-searched data which has been vector-quantized as described above and provided by the registrant apparatus 70 via a communication circuit NW or via a CD-ROM or such, and then, stores the provided to-be-searched data in the to-be-searched data storing part 63.

The non-reversible code converting part 41 converts a query word input from the user apparatus 30 into non-reversible codes after converting the query word into a character storing image the same as in the second embodiment, and transfers thus-obtained rectangle characteristics (i.e. shape characteristics) having been converted into the non-reversible codes, to the vector quantizing part 61. The vector quantizing part 61 carries out vector quantization of the query word having been converted into the non-reversible codes and transferred from the non-reversible code converting part 41, by comparing with the representative vectors of the codebook 62, the same as in FIG. 21, and transfers a thus-obtained symbol sequence of the query word to the comparing part 42. Therefore, the non-reversible code converting part 41, the vector quantizing part 61 and the codebook 62 act as a converting part in their entirety to carry out the converting process.

The comparing part 42 compares the symbol sequence quantized from the query word and received from the vector quantizing part 61, with the symbol sequences (the vector-quantized to-be-searched data) quantized and taken from the to-be-searched data storing part 44 by the document taking part 43, and transmits the comparison result to the user apparatus 30.

Thus, in the search system 50 in the third embodiment, the to-be-searched data storing part 63 of the data search apparatus 60 stores shape characteristics of rectangles within lines (i.e., divided parts) of to-be-searched data as images or to-be-searched data having been converted into images having been vector-quantized. The non-reversible code converting part 41 converts an input query word, i.e., search characters, into an image, converts shape characteristics of the query word image into non-reversible codes and vector-quantizes them. The comparing part 42 compares the thus-non-reversibly encoded and vector-quantized query word with the to-be-searched data having been converted into non-reversible codes, vector-quantized and taken from the to-be-searched data storing part 44 by the document taking part 43, and thus, carries out search.

Therefore, it is possible to further effectively prevent original to-be-searched data from being restored with the use of a search target, and thus, it is possible to further positively ensure confidentiality of the to-be-searched data. Also, it is possible to carry out search only by inputting search characters. This, it is possible to improve usability/convenience of data search inexpensively.

Further, in the to-be-searched data storing part 63 of the data search apparatus 60, search result information is stored together with to-be-searched data to be provided as search results, for each of predetermined divided parts of the to-be-searched data. The above-mentioned search result information includes page numbers, line numbers, or such.

Therefore, it is possible to provide search result information such a page number, a line number, a character position or such of to-be-searched data which corresponds to a query word.

Further, both to-be-searched data and a query word are converted into non-reversible codes and then, vector-quantized and thus-obtained vector sequences are used to comparison and search. Therefore, comparison failure caused by quantization error can be avoided.

Further, as described above, in the codebook 62, only representative vectors obtained from results of vector conversion from to-be-searched data of the to-be-searched data storing part 21 of the registrant apparatus 70 are included. Therefore, it is difficult to restore the original to-be-searched data in a state of before being converted into non-reversible codes and being vector quantized, from the codebook 62 and the to-be-searched data having been vector-quantized with the use of the codebook 62. Thus, it is possible to further improve confidentiality.

Further, the number of representative vectors stored in the codebook 62 (i.e., a size of the codebook), used for vector quantization, may be adjusted. Thereby, it is possible to adjust a quantization degree.

It is noted that, in the above discussion, the data search system 50 is configured such that, with the use of the communication circuit NW, the data search apparatus 60, the registrant apparatus 70 and the user apparatus 30 are connected, to-be-searched data converted into non-reversible codes and vector-quantized is registered in the data search apparatus 60 from the registrant apparatus 20. Then, the data search apparatus 60 provides the to-be-searched data to be searched by the user apparatus 30. However, as a configuration of the data search system 50, the above-mentioned configuration is not limited to. For example, a search user may be provided with a CD-ROM in which, to-be-searched data (non-reversibly encoded and vector-quantized sentences), a codebook 62 and a data search program is stored which controls a computer such as a personal computer of the search user, are recorded. The search user may install the data search program in the own computer as a result of the CD-ROM storing the data search program being read by the computer.

As a result, it may be possible to build a data search system in which the data search system 60 and the user apparatus 30 shown in FIG. 19 are integrated in the computer. Then, with the use of the thus-built data search apparatus in the computer, a query word input via a keyboard (input part) of the computer is converted into a non-reversible code and vector-quantized with the use of the codebook 62 stored in the CD-ROM or copied to a hard disk of the computer, and the to-be-searched data converted into the non-reversible codes, vector-quantized and stored in the CD-ROM or copied to the hard disk drive of the computer may be searched with the use of the non-reversibly converted and vector-quantized query word.

By thus providing the to-be-searched data (encoded sentences) itself to the user, the data search system 60 connected to the communication circuit NW is not necessary. Thus, it is possible to simplify the data search system 50, to save costs. Also, it is possible to make a secret of the original sentences because it is difficult to restore the original sentences from the encoded sentences. Further, in this case, the user should not depend from a search service, and can carry out search with the use of the own working environment. Thus, it is possible to improve usability. In particular, the original to-be-searched data such as literary writings or such itself is not used as search targets. Instead, to the data search apparatus 60, only the to-be-searched data having been converted into non-reversible codes, and further quantized with the usage of the codebook 62, as well as the vector quantizing method (i.e., codebook comparison) are transferred. Therefore, it is possible to further improve confidentiality of the to-be-searched data, and thus, it is possible to promote literary writings or such to be easily provided as the to-be-searched data. Further, there are uses of finding locations of past searched information other than uses of finding unknown information. In the former case, when search data of own collection of books, or books for which the user has a reading history has been stored in the user's own computer, it is possible to reduce required time to find a search result because search targets are thus limited. Also, it is possible to prevent useless search results, and thus, it is possible to improve usability/convenience.

Further, in the data search system 50, a functional configuration is scattered or decentralized in a state of being divided into the data search apparatus 60, the registrant apparatus 70 and the user apparatus 30 as shown in FIG. 19. However, a specific scattering manner is not limited thereto, and another appropriate manner of scattering or decentralizing the functional configuration, if any, may be used instead.

The present invention is not limited to the specifically disclosed embodiments, and variations and modifications may be made without departing from the scope of the present invention.

The present invention may be used as a data search system, a data search apparatus, a data search method, a program and a computer readable information recording medium, for making it possible to search to-be-searched data such as literary writings or such, with keeping confidentiality of the to-be-searched data.

The present application is based on Japanese priority applications Nos. 2007-195255 and 2008-181694 filed Jul. 26, 2007 and Jul. 11, 2008, respectively, the entire contents of which are hereby incorporated herein by reference.

What is claimed is:
1. A data providing apparatus for providing to-be-searched data including a search query, comprising:
 a storing part configured to store, in association with each other, shape characteristics of the to-be-searched data which have been non-reversibly encoded according to an encoding method, and search result information to be provided as a search result with respect to the to-be-searched data;

a converting part configured to non-reversibly encode shape characteristics of the search query according to the same method as the encoding method;

an obtaining part configured to obtain the search result information which is associated with non-reversibly encoded shape characteristics of the to-be-searched data, with the use of the non-reversibly encoded shape characteristics of the search query; and a providing part configured to provide the thus-obtained search result information, wherein the encoding method includes sequentially performing a rectangle extracting process, a line extracting process, a quantizing process and a symbol generating process, wherein the rectangle extracting process extracts a rectangle for each character included in the to-be-searched data and the search query, the line extracting process generates lines by connecting adjacent rectangles, and the quantizing process and the symbol generating process are carried out on each of the extracted rectangles of the respective characters.

2. The data providing apparatus as claimed in claim 1, wherein: the obtaining part uses a plurality of sets of non-reversibly-encoded to-be-searched data corresponding to the search query, and obtains the search result information associated with each one of the plurality of sets of non-reversibly-encoded to-be-searched data.

3. The data providing apparatus as claimed in claim 1, wherein the line extracting process generates lines in a horizontal and vertical direction that surround the adjacent rectangles.

4. The data providing apparatus as claimed in claim 3, wherein the quantizing process quantizes each extracted rectangles into numeric values using the generated lines, the numeric values representing an arrangement state of a respective extracted rectangle within the generated lines.

5. The data providing apparatus as claimed in claim 4, wherein the symbol generating process generates symbols based on the numeric values, each symbol corresponding to a different extracted rectangle.

6. A data providing method for providing to-be-searched data including a search query, with the use of a storing part configured to store, in association with each other, shape characteristics of the to-be-searched data which have been non-reversibly encoded according to an encoding-method, and search result information to be provided as a search result with respect to the to-be-searched data, said method comprising:

a converting step of non-reversibly encoding shape characteristics of the search query according to the same method as the encoding method;

an obtaining step of obtaining the search result information which is associated with non-reversibly encoded shape characteristics of the to-be-searched data, with the use of the non-reversibly encoded shape characteristics of the search query; and a providing step of providing the thus-obtained search result information, wherein the encoding method includes sequentially performing a rectangle extracting process, a line extracting process, a quantizing process and a symbol generating process, wherein the rectangle extracting process extracts a rectangle for each character included in the to-be-searched data and the search query, the line extracting process generates lines by connecting adjacent rectangles, and the quantizing process and the symbol generating process are carried out on each of the extracted rectangles of the respective characters.

7. The data providing method as claimed in claim 6, wherein:

the obtaining step comprises a step of using a plurality of sets of non-reversibly-encoded to-be-searched data corresponding to the search query, and obtaining the search result information associated with each one of the plurality of sets of non-reversibly-encoded to-be-searched data.

8. The data providing method as claimed in claim 6, wherein the line extracting process generates lines in a horizontal and vertical direction that surround the adjacent rectangles.

9. The data providing method as claimed in claim 8, wherein the quantizing process quantizes each extracted rectangles into numeric values using the generated lines, the numeric values representing an arrangement state of a respective extracted rectangle within the generated lines.

10. The data providing method as claimed in claim 9, wherein the symbol generating process generates symbols based on the numeric values, each symbol corresponding to a different extracted rectangle.

11. A computer-readable medium tangibly embodying a program which, when executed by a computer processor, performs a data providing method for providing to-be-searched data including a search query, with the use of a storing part configured to store, in association with each other, shape characteristics of the to-be-searched data which have been non-reversibly encoded according to an encoding method, and search result information to be provided as a search result with respect to the to-be-searched data, said method comprising:

a converting step of non-reversibly encoding shape characteristics of the search query according to the same method as the encoding method;

an obtaining step of obtaining the search result information which is associated with non-reversibly encoded shape characteristics of the to-be-searched data, with the use of the non-reversibly encoded shape characteristics of the search query; and a providing step of providing the thus-obtained search result information, wherein the encoding method includes sequentially performing a rectangle extracting process, a line extracting process, a quantizing process and a symbol generating process, wherein the rectangle extracting process extracts a rectangle for each character included in the to-be-searched data and the search query, the line extracting process generates lines by connecting adjacent rectangles, and the quantizing process and the symbol generating process are carried out on each of the extracted rectangles of the respective characters.

12. The computer-readable medium as claimed in claim 11, wherein:

the obtaining step comprises a step of using a plurality of sets of non-reversibly-encoded to-be-searched data corresponding to the search query, and obtaining the search result information associated with each one of the plurality of sets of non-reversibly-encoded to-be-searched data.

13. The computer-readable medium as claimed in claim 11, wherein the line extracting process generates lines in a horizontal and vertical direction that surround the adjacent rectangles.

14. The computer-readable medium as claimed in claim 13, wherein the quantizing process quantizes each extracted rectangles into numeric values using the generated lines, the numeric values representing an arrangement state of a respective extracted rectangle within the generated lines.

15. The computer-readable medium as claimed in claim 14, wherein the symbol generating process generates symbols based on the numeric values, each symbol corresponding to a different extracted rectangle.

* * * * *

UNITED STATES PATENT AND TRADEMARK OFFICE
CERTIFICATE OF CORRECTION

| | |
|---|---|
| PATENT NO. | : 8,166,057 B2 |
| APPLICATION NO. | : 12/219664 |
| DATED | : April 24, 2012 |
| INVENTOR(S) | : Yoshihisa Ohguro |

It is certified that error appears in the above-identified patent and that said Letters Patent is hereby corrected as shown below:

On the Title page, item (73) should read:

(73)   Assignee:   Ricoh Company, Ltd., Tokyo (JP)

Signed and Sealed this
Thirty-first Day of July, 2012

David J. Kappos
*Director of the United States Patent and Trademark Office*